US012790143B2

(12) United States Patent
Hashimoto

(10) Patent No.: US 12,790,143 B2
(45) Date of Patent: Nov. 10, 2026

(54) SYSTEM AND METHOD FOR PROVIDING VEHICLE LOADING RECOMMENDATION

(71) Applicant: TOYOTA JIDOSHA KABUSHIKI KAISHA, Toyota (JP)

(72) Inventor: Daisuke Hashimoto, Chofu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 369 days.

(21) Appl. No.: 18/640,444

(22) Filed: Apr. 19, 2024

(65) Prior Publication Data

US 2025/0326593 A1 Oct. 23, 2025

(51) Int. Cl.
*B65G 67/04* (2006.01)
*G06T 7/62* (2017.01)

(52) U.S. Cl.
CPC ................ *B65G 67/04* (2013.01); *G06T 7/62* (2017.01)

(58) Field of Classification Search
CPC .................................. B65G 67/04; G06T 7/62
See application file for complete search history.

(56) References Cited

U.S. PATENT DOCUMENTS

2020/0394746 A1* 12/2020 Krishnamurthy .. G01C 21/3407
2021/0073726 A1* 3/2021 Okodo ............... G06Q 10/0832
2021/0155185 A1* 5/2021 Christensen ...... B60R 21/01554
2021/0174058 A1* 6/2021 Uchibori .................. A45C 7/00
2021/0188287 A1* 6/2021 Taveira .................. B62D 1/183
2021/0279501 A1* 9/2021 Schimmel .............. G06V 20/00
2023/0256821 A1* 8/2023 Cha ........................ B60K 35/10
340/686.1

* cited by examiner

*Primary Examiner* — Kyle O Logan
(74) *Attorney, Agent, or Firm* — Sughrue Mion, PLLC

(57) ABSTRACT

Example embodiments of the present disclosure provide at least one loading recommendation to a user. According to embodiments, a method for providing the at least one loading recommendation may be provided. The method may include: obtaining, from a user equipment (UE) associated with the user, first information associated with an object; determining, based on the first information, a size of the object; obtaining, from a vehicle system implemented in a vehicle, second information associated with the vehicle; determining, based on the second information, a free space in the vehicle; determining, based on the size of the object and the free space in the vehicle, the at least one loading recommendation; and providing, to the UE, the at least one loading recommendation.

20 Claims, 11 Drawing Sheets

SYSTEM AND METHOD FOR PROVIDING VEHICLE LOADING RECOMMENDATION

TECHNICAL FIELD

Example embodiments of the present disclosure relate to loading management of a vehicle, and more particularly, to the provisioning of one or more loading recommendations for appropriately loading an object onto the vehicle.

BACKGROUND

Optimizing the loading of a vehicle is crucial for various reasons, since the loading of the vehicle may affect the efficiency in transportation, the safety of both vehicle occupants and transported items, and the compliance with legal requirements. For instance, a properly loaded vehicle may be more fuel-efficient and may have higher stability and control during transit, leading to smoother and more efficient journeys. On the other hand, an improperly loaded vehicle may have less effective handling and braking, increasing the difficulties in controlling the vehicle (especially during emergency maneuvers or uneven road surfaces) and leading to a high risk of accidents (e.g., mechanical parts failure, tire blowouts, etc.) Similarly, properly loading the items or cargo to the vehicle can prevent the items or cargo from shifting or moving, thereby reducing the risk of the items or cargo being damaged or broken during transit. Furthermore, many jurisdictions have strict regulations regarding vehicle loading, including weight limits, axle loadings, and cargo securing requirements. Compliance with these regulations is essential to avoid penalties, fines, or legal liabilities resulting from accidents or violations.

Different types of vehicles have varying loading capacities and configurations, according to their respective design, purpose, and structure. For instance, a passenger car generally has a limited cargo space compared to larger vehicles, but may have features like foldable rear seats to create extra spaces for accommodating larger items when required. On the other hand, a truck may have a larger cargo space compared to the passenger car, but may require the user to have specific skills and knowledge to adhere the load to the cargo. Thus, in order to maximize the loading capacity of the vehicle, the user is required to first have a good understanding of the features and configurations of the vehicle.

Further, proper load management of a vehicle requires the user to understand the current loading conditions in the vehicle, the size and limitations of the loaded objects and the new object to be loaded, as well as the limitations defined by the legal requirements, in order to employ appropriate strategies to maximize the loading capacity of the vehicle while ensuring safety and compliance to the legal requirements.

Nevertheless, the approaches for determining the loading arrangement of a vehicle in the related art rely heavily on manual inspection and estimation, leading to potential errors and inefficiencies. For instance, when a user would like to know whether or not the vehicle has sufficient loading capacity for accommodating an object, but the user is away from the vehicle, the user may need to travel to the vehicle to determine the available loading capacity of the vehicle, or the user may simply estimate the loading capacity and/or assume that the object fits/does not fit into the vehicle. Similarly, the user may not be able to accurately determine whether or not an object can fit into a vehicle when the user does not have access to the actual object yet.

On the other hand, the user may not be familiar with the alternate configuration of the vehicle (e.g., how to fold down a seat to gain additional loading capacity, etc.), and thus may not be able to accurately determine the loading capacity of the vehicle. Furthermore, the user may not be familiar with the traffic regulations or legal requirements, and may erroneously consider that the vehicle has sufficient loading capacity and unintentionally overload the vehicle and/or cause safety hazards.

In view of at least the above reasons, there is a need to determine and provide one or more loading recommendations for appropriately loading the object onto the vehicle.

SUMMARY

Example embodiments consistent with the present disclosure provide methods, systems, and apparatuses for effectively and efficiently determine and provide one or more loading recommendations to a user.

According to embodiments, a method, performable by at least one processor of a server to provide at least one loading recommendation to the user, is provided. The method may include: obtaining, from a user equipment (UE) associated with the user, first information associated with an object; determining, based on the first information, a size of the object; obtaining, from a vehicle system implemented in a vehicle, second information associated with the vehicle; determining, based on the second information, a free space in the vehicle; determining, based on the size of the object and the free space in the vehicle, the at least one loading recommendation; and providing, to the UE, the at least one loading recommendation According to embodiments, a system, implemented in a server for providing at least one loading recommendation to the user, is provided. The system may include a memory storage configured to store computer-executable instructions and at least one processor communicatively coupled to the memory storage. The at least one processor may be configured to execute the instructions to: obtain, from a UE associated with the user, first information associated with an object; determine, based on the first information, a size of the object; obtain, from a vehicle system implemented in a vehicle, second information associated with the vehicle; determine, based on the second information, a free space in the vehicle; determine, based on the size of the object and the free space in the vehicle, the at least one loading recommendation; and provide, to the UE, the at least one loading recommendation.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like reference numerals denote like elements, and wherein.

DETAILED DESCRIPTION

Figure 1:
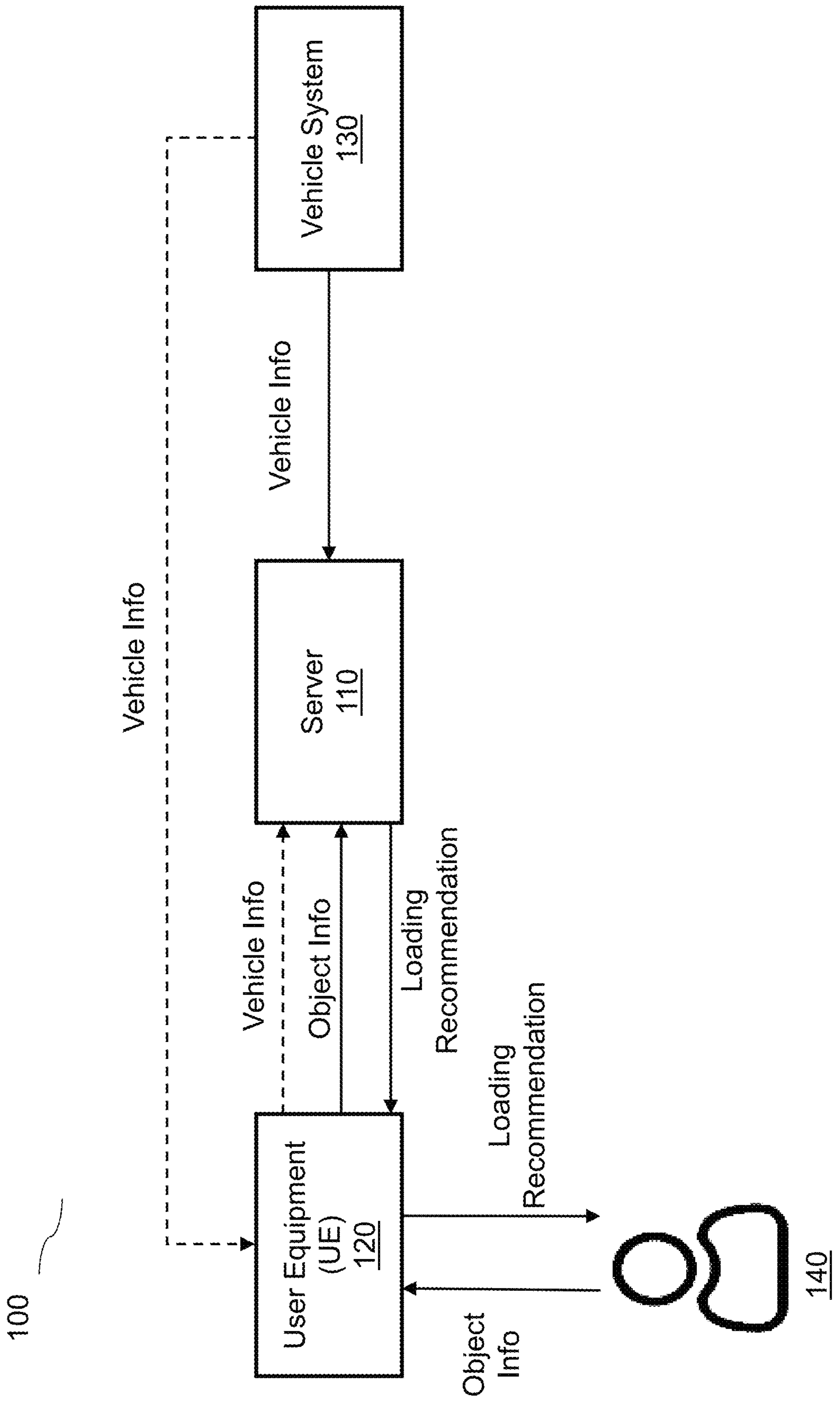
FIG. 1 illustrates a diagram of a generic system architecture, according to one or more example embodiments.

The following detailed description of exemplary embodiments refers to the accompanying drawings. The foregoing disclosure provides illustration and description but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "[A] and/or [B]", "at least one of [A] and [B]" or "at least one of [A] or [B]" are to be understood as including only A, only B, or both A and B.

Reference throughout this specification to "one embodiment," "an embodiment," "non-limiting exemplary embodiment," or similar language means that a particular feature, structure, or characteristic described in connection with the indicated embodiment is included in at least one embodiment of the present solution. Thus, the phrases "in one embodiment", "in an embodiment," "in one non-limiting exemplary embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

Furthermore, the term "vehicle" described herein refers to any suitable type of vehicle in which example embodiments of the present disclosure can be implemented. For instance, the "vehicle" may refer to motorized vehicle such as a car, a truck, a bus, a motorcycle, or any other suitable type of automobile powered by an engine, motor, or other mechanical means. Alternatively or additionally, the "vehicle" described herein may refer to a non-motorized vehicle, such as a bicycle, a roller skates, a kick scooter, and the like, without departing from the scope of the present disclosure.

FIG. 1 illustrates a diagram of a generic system architecture 100, according to one or more example embodiments. As illustrated in FIG. 1, the system architecture may involve at least one server 110, at least one user equipment (UE) 120, at least one vehicle system 130, and at least one user 140. It is contemplated that the system architecture 100 in FIG. 1 is simplified for descriptive purposes, and the system architecture 100 may be different according to the actual implementation. For instance, a plurality of servers 110 and/or a plurality of UEs 120 may also be utilized, without departing from the scope of the present disclosure.

The server 110 may have a loading recommendation system implemented therein to provide one or more loading recommendations to the user 140. Generally, the loading recommendation system may obtain, from the vehicle system 130, information associated with a vehicle ("vehicle information" hereinafter) where the vehicle system 130 is implemented, and obtain, from the UE 120, information associated with an object to be loaded onto the vehicle ("object information" hereinafter). In some example embodiments, the loading recommendation system of the server 110 may obtain the vehicle information from the UE 120, in addition to or in alternative to obtaining the vehicle information from the vehicle system 130.

The vehicle information may include, for example, vehicle identification (ID) information (e.g., license plate number, vehicle identification number (VIN), vehicle chassis number, etc.), vehicle type (e.g., sedan, truck, motorcycle, etc.), fuel information (e.g., fuel consumption, remaining fuel level, etc.), vehicle position or location, tires information (e.g., air pressure, load rating, etc.), current vehicle weight, information of the vehicle cabin, information of the vehicle trunk, and the like. The information of the vehicle cabin may include: current loading conditions in the vehicle cabin (e.g., number of passengers, size of passengers, number of loaded objects, size of loaded objects, distribution of the loaded objects, etc.), current temperature in the vehicle cabin, current seat configuration or arrangement, current loading conditions of the interior features (e.g., storage compartments, cup holders, etc.) in the vehicle cabin, and the like. The information of the vehicle trunk may include: current loading conditions in the trunk (e.g., number of loaded objects, size of loaded objects, distribution of the loaded objects, etc.), current temperature in the vehicle cabin, and the like. As further described below, the server 110 (or the loading recommendation system implemented therein) may utilize the vehicle information to determine whether or not the vehicle has any free space available for loading an object.

According to example embodiments, the server 110 (or the loading recommendation system implemented therein) may obtain the vehicle information in the form of image data (e.g., photos, scanned documents, etc.), and then perform one or more image processing operations to obtain the vehicle information from the image data. For instance, the server 110 may obtain one or more images of the vehicle cabin and one or more images of the vehicle trunk, and then perform one or more object recognition operations on the images to obtain the information of the vehicle cabin and the information of the vehicle trunk therefrom.

On the other hand, the object information may include, for example, type of the object (e.g., temperature sensitive, fragile, live animal, etc.), size of the object (e.g., dimension, weight, volume, etc.), special loading requirements (e.g., positioning, ventilation, sensitivity to vibration, weather resistance, etc.), and the like. As further described below, the server 110 (or the loading recommendation system implemented therein) may utilize the object information to determine whether or not the object can be loaded to the free space of the vehicle while complying with the loading requirement(s) of the object and the traffic regulations or legal requirements.

According to example embodiments, the server 110 (or the loading recommendation system implemented therein) may obtain the object information in the form of image data (e.g., photos, scanned documents, etc.), and then perform one or more image processing operations to obtain the object information from the image data. For instance, the server 110 may obtain an image of the object and then determine the size of the object by utilizing one or more computer vision operations and/or one or more image processing techniques. By way of example, the server 110 may process the image data to calibrate a relationship between pixels in the image and the object, calculate the size of the object in pixels, and then convert the size of the object in an appropriate measurement unit (e.g., cm, m, etc.). The server 110 may also perform other suitable operations, such as image quality enhancement (e.g., noise reduction, image smoothing, etc.), feature extraction, scale invariance, and the like, without departing from the scope of the present disclosure.

According to example embodiments, the server 110 (or the loading recommendation system implemented therein) may obtain the object information in the form of a 3D model (or any other suitable type of 3D representation of the object). The 3D model may include the shape and texture of the object, and may be generated (by the server 110, by the UE 120, etc.) via one or more photogrammetry operations that involve images taken from multiple angles and sides of the object (with an image capturing device rotated around the object, with multiple image capturing devices surrounding the object, etc.) In this case, the server 110 may obtain the object information from the 3D model by performing one or more 3D processing operations (e.g., geometric analysis, texture mapping, and feature extraction, shape descriptors, object classification, etc.) on the 3D model.

According to example embodiments, the server 110 (or the loading recommendation system implemented therein) may obtain the object information in the form of text, and then perform one or more language processing operations (e.g., natural language processing (NLP), etc.) to obtain the object information from the text. For instance, the server 110 may receive the descriptions of the object (e.g., text describing the size of the object, the characteristic of the object, special loading requirement of the object, etc.), name or title of the object, type or category of the object (e.g., groceries, furniture, animal, etc.), an ID of the object (e.g., product ID, model number, etc.), quick-response (QR) code associated with the object, Uniform Resource Locator (URL) address to a product website of the object, and the like. In this regard, if the server 110 detects that the text includes information associated with the object (e.g., descriptions of the object, name or title of the object, type or category of the object, etc.), the server 110 may perform one or more NLP operations (e.g., with at least one large language model (LLM), etc.) to extract the object information from the text. Additionally or alternatively, if the server 110 detects that the text includes information (e.g., QR code, URL address, etc.) for accessing an external link or a database (e.g., an internet server, etc.), the server 110 may access the external link or database to obtain the object information therefrom.

Upon obtaining the vehicle information and the object information, the server 110 (or the loading recommendation system implemented therein) may be configured to utilize said information to determine one or more loading recommendations and then provide the loading recommendation(s) to the user 140 via the UE 120. According to example embodiments, the server 110 may determine a size of the object based on the object information and determine a free space in the vehicle based on the vehicle information, and then determine the one or more loading recommendations based on the size of the object and the free space of the vehicle. Accordingly, the server 110 may provide the one or more loading recommendations to the UE 120, such that the UE 120 may present the one or more loading recommendations to the UE 140.

According to example embodiments, upon receiving the object information, the server 110 (or the loading recommendation system implemented therein) may determine whether or not additional object information is required. For instance, the server 110 may utilize the at least one LLM model to process the received object information, and then determine whether or not the received object information contains sufficient information for determining the size of the object (and any other information such as specific loading requirement, etc.) Accordingly, based on determining that the received object information does not contain sufficient information for determining the size of the object, the server 110 may communicate with the UE 120 to request additional object information from the user 140.

According to example embodiments, the server 110 (or the loading recommendation system implemented therein) may determine the one or more loading recommendations by determining, based on the size of the object and the free space of the vehicle, whether or not the vehicle has sufficient loading capacity for accommodating the object, and then determine the one or more loading recommendations based thereon. For instance, based on determining that the vehicle has sufficient loading capacity for accommodating the object, the server 110 may determine one or more loading configurations (e.g., stacking, positioning, etc.) within the free space of the vehicle and then include the one or more loading configurations in the one or more loading recommendations (an example use case associated therewith are described below with reference to FIG. 2C). On the other hand, based on determining that the vehicle does not have sufficient loading capacity for accommodating the object, the server 110 may obtain, from a storage medium (e.g., a database, a memory storage, etc.), information associated with a specification of the vehicle, and then determine one or more alternative configurations for loading the object based thereon (example use cases associated therewith are described below with reference to FIG. 2D and FIG. 2E).

According to example embodiments, the server 110 (or the loading recommendation system implemented therein) may be configured to determine whether or not the vehicle has sufficient loading capacity by comparing the size of the object and the free space in the vehicle. Based on determining that the free space is equal to or greater than the size of the object, the server 110 may obtain, from a storage medium (e.g., a memory storage of the server 110, a memory storage of the vehicle system 130, a database, another server, etc.), information associated with at least one legal requirement or traffic regulation. The legal requirement/traffic regulation information may include, for example, weight limits associated with the vehicle, size restrictions, securement regulations, hazardous materials regulations, clearance height limits, axle weight limits, load projection regulations, load height restrictions, restrictions on transporting live animals, and the like. Accordingly, the server 110 may determine whether loading the object onto the free space fulfills or violates the at least one legal requirement/traffic regulation. In this regard, based on determining that the loading of the object onto the free space fulfills the at least one legal requirement, the server 110 may determine that the vehicle has sufficient loading capacity for the object. On the other hand, based on determining that the free space is smaller than the size of the object or based on determining that loading the object onto the free space violates the at least one legal requirement, the server 110 may determine that the vehicle does not have sufficient loading capacity for the object.

According to example embodiments, in addition to the size of the object and the legal requirement, the server 110 may also determine whether or not the vehicle has sufficient loading capacity for the object, taking into consideration at least one loading requirement associated with the object. For instance, the received vehicle information may include a temperature in the vehicle cabin and/or a temperature in the vehicle trunk, and the received object information may include a type of the object (e.g., grocery, explosive, etc.) and/or a temperature requirement for loading the object (e.g., the object should be loaded in an environment under 25° C., etc.). In this regard, upon receiving the object information, the server 110 may determine whether or not the object is temperature-sensitive (e.g., grocery, explosive, etc.). Accordingly, based on determining that the object is temperature-sensitive, the server 110 may determine, based on the temperature requirement and the temperature in the vehicle cabin and/or the temperature in the vehicle trunk, whether or not the object can be loaded onto the free space in the vehicle cabin and/or the free space in the vehicle trunk.

For instance, the server 110 may determine that both the vehicle cabin and the vehicle trunk have free space that can accommodate the object, but the vehicle trunk has a temperature higher than the vehicle cabin and the temperature in the vehicle trunk is higher than the temperature requirement associated with the object. In this case, the server 110 may recommend the user 140 to load the object onto the vehicle cabin instead of the vehicle trunk. As another example, the server 110 may determine that both the vehicle cabin and the vehicle trunk have free space that can accommodate the object, and both the temperatures in the vehicle cabin and the vehicle trunk are lower than the temperature requirement associated with the object. In this case, the server 110 may recommend the user 140 to load the object onto the free space that has a lower temperature and/or a wider space. In some example embodiments, the server 110 may also be configured to suggest the configuration of the air conditioning system of the vehicle to maintain the temperature of the loaded object to be suppressed below the associated temperature requirement. Further, the server 110 may also be configured to suggest to the user 140 one or more recommendations (e.g., recommend utilization of an amount of ice or dry ice (e.g., in grams, kilograms, and the like), recommend utilization of a specific size/type of cooler box, etc.) to keep the temperature of the loaded object to be suppressed below the associated temperature requirement until the vehicle reaches to a destination.

In view of the above, the server 110 may obtain object information from the UE 120 and the vehicle information from the vehicle system 130 (and/or the UE 120), and then provide one or more loading recommendations to the user 140 based thereon. Example use cases associated with the provisioning of loading recommendation(s) are described in the following with reference to FIG. 2A to FIG. 2E.

Figure 2A:
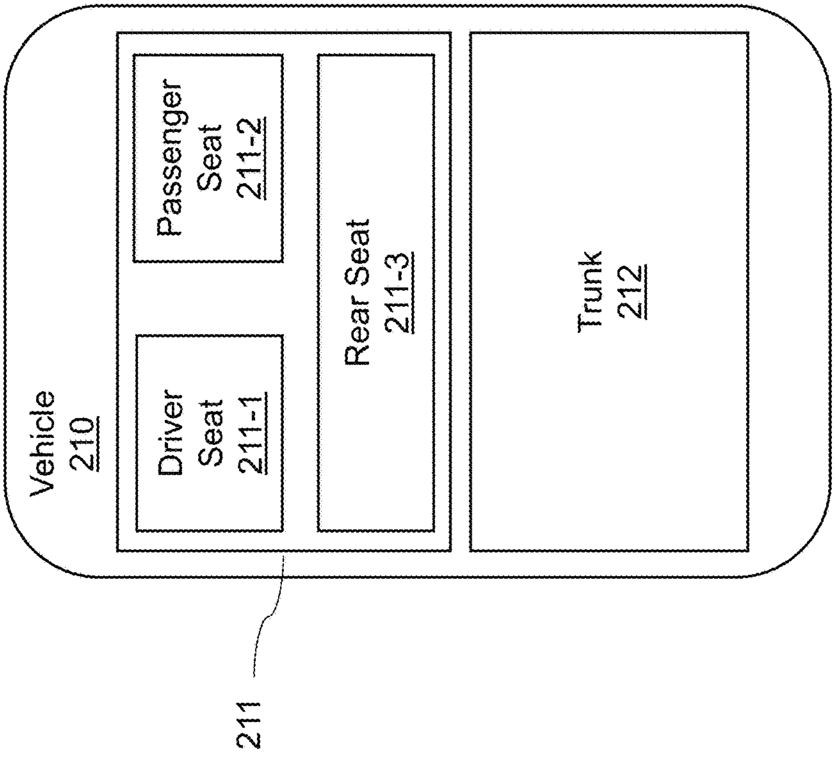
FIG. 2A to FIG. 2E each illustrates a diagram of a respective example layout of the vehicle, according to one or more example embodiments.

FIG. 2A illustrates a diagram of an example layout of a vehicle 210, according to one or more example embodiments. The vehicle 210 may include a vehicle cabin 211 and a trunk 212. The vehicle cabin 211 may include a driver seat 211-1, a passenger seat 211-2, and a rear seat 211-3. In this example, a configuration of the vehicle when the vehicle 210 is empty is illustrated. Such configuration may be included in a specification of the vehicle, which may be stored in one or more storage mediums (e.g., storage of the server 110, storage of the vehicle system 130, etc.) and be retrieved or obtained by the server 110 when required.

Figure 2B:
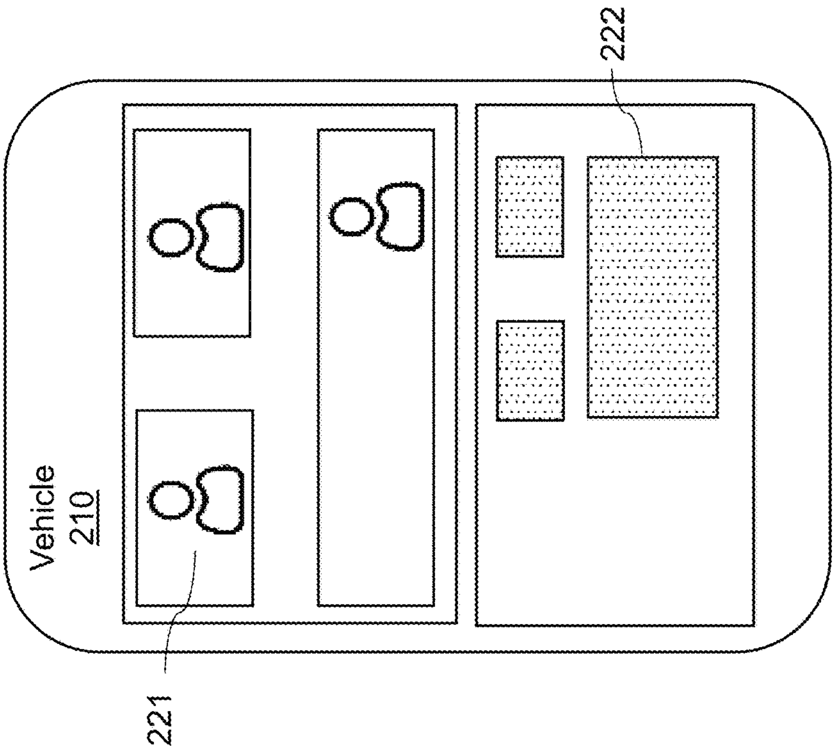

FIG. 2B illustrates a diagram of another example layout of the vehicle 210, according to one or more example embodiments. In this example, a configuration of the vehicle when the vehicle 210 enters the ignition-off (IG-Off) state is illustrated. As illustrated, at the time when the vehicle 210 enters the IG-Off state, the vehicle 210 has three users seated in the vehicle cabin and three objects loaded onto the vehicle trunk 212. The sitting position of each of the users is presented in a respective user icon 221 (i.e., a first user is seated at the driver seat 211-1, a second user is seated at the passenger seat 211-2, and a third user is seated at the rear seat 211-3), and the position of each of the loaded objects are presented in a respective loaded object icon 222. These vehicle information are captured by the vehicle system 130 (when the vehicle system detects a change in the ignition state of the vehicle, etc.) and provided to the server 110 thereafter.

Figure 2D:
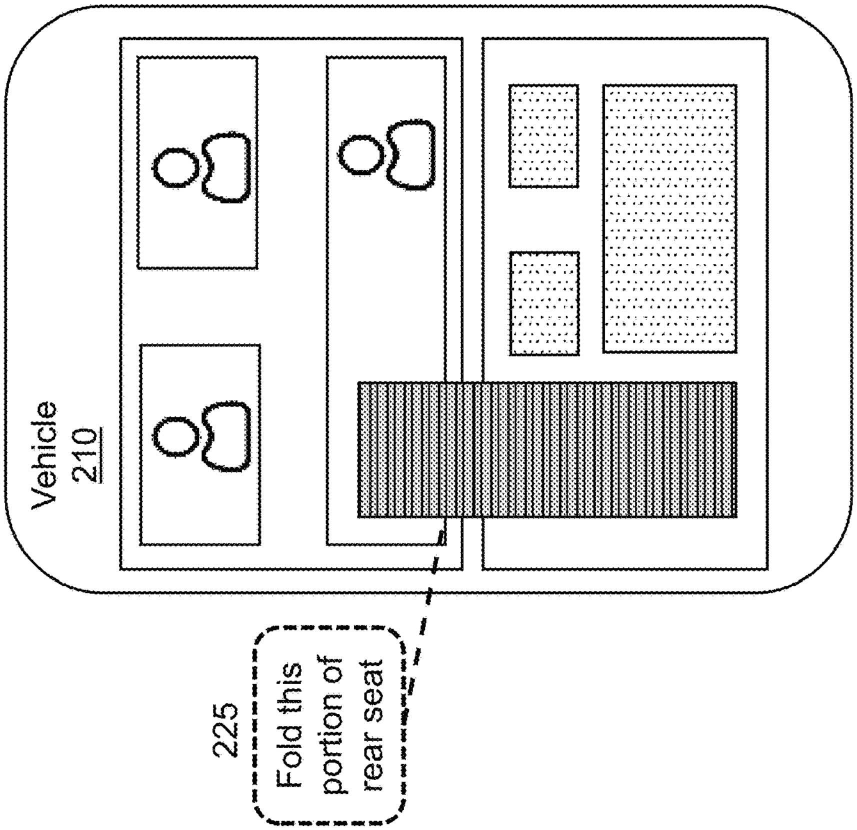
Figure 2C:
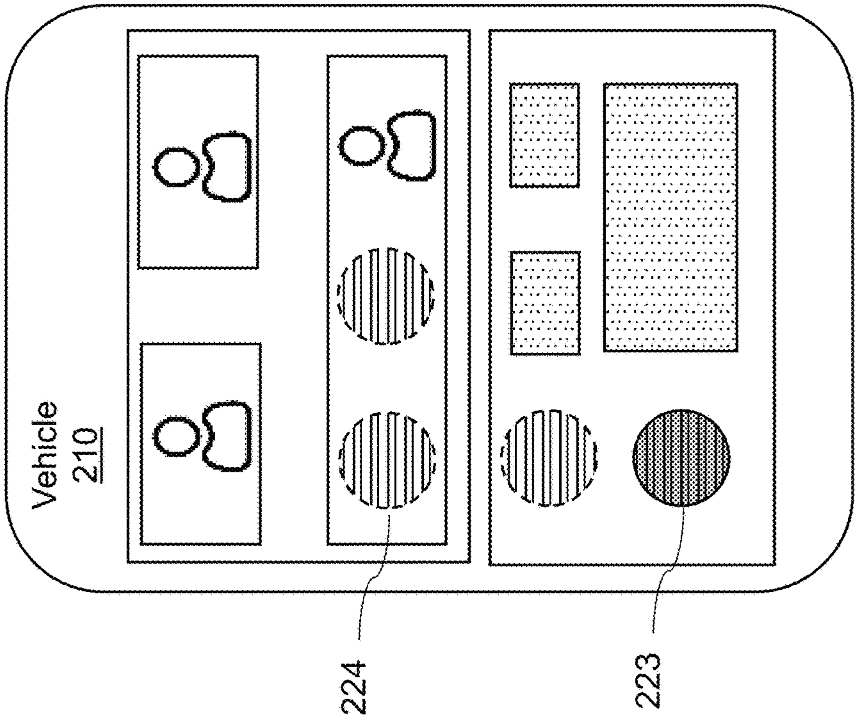

FIG. 2C illustrates a diagram of another example layout of the vehicle 210, according to one or more example embodiments. In this example, a user would like to load a new object that has a round shape onto the vehicle 210, while the vehicle information (e.g., number of users seated in the vehicle cabin, number and arrangement of objects loaded onto the vehicle trunk, etc.) substantially similar to those illustrated in FIG. 2B. The user provides the object information to the server 110 and the server 110 determines a plurality of loading recommendations for loading the new object onto the vehicle 210. As illustrated in FIG. 2C, a primary loading recommendation for loading the new object is presented in an icon 223, and a plurality of secondary/alternative loading recommendations for loading the new object are each presented in a respective icon 224. The loading recommendations may be determined or decided (by the server 110) based on, for example, the loading requirement (e.g., temperature requirement, positioning requirement, etc.) associated with the new object, a loading preference of the user (e.g., prioritize vehicle trunk over vehicle cabin, etc.), and the like.

FIG. 2D illustrates a diagram of another example layout of the vehicle 210, according to one or more example embodiments. In this example, the user would like to load a new object that has a rectangle shape onto the vehicle 210, while the vehicle information (e.g., number of users seated in the vehicle cabin, number and arrangement of objects loaded onto the vehicle trunk, etc.) substantially similar to those illustrated in FIG. 2B. The user provides the object information to the server 110 and the server 110 determines that, under the current configuration of the vehicle, the vehicle trunk and the vehicle cabin do not have sufficient loading capacity to accommodate the new object. In this regard, the server 110 may determine an alternative configuration 225 of the vehicle, such as folding a portion of the rear seat 211-3, to create sufficient loading capacity for the new object.

In some example embodiments, the server 110 may determine the recommendation(s) of the re-arrangement of already loaded objects and the loading recommendation(s) for loading the new object. For example, the server 110 may recommend moving one or more of the already loaded objects to the vehicle cabin for creating more free space in the vehicle trunk. In another example, the server 110 may recommend piling up the already loaded objects to create more free space in the vehicle trunk.

Figure 2E:
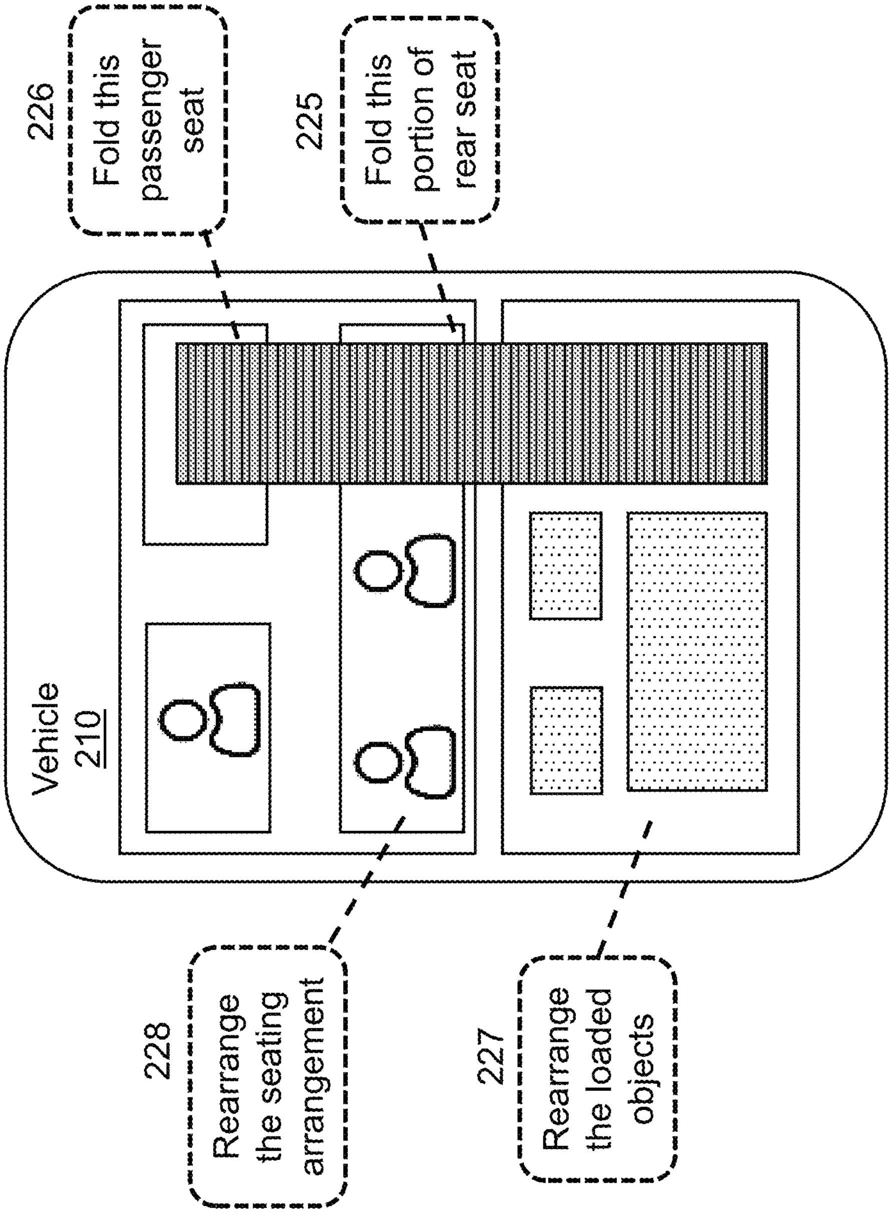

FIG. 2E illustrates a diagram of another example layout of the vehicle 210, according to one or more example embodiments. In this example, the user would like to load a new object that has a rectangle shape (with a length longer than the new object illustrated in FIG. 2D) onto the vehicle 210. The user provides the object information to the server 110 and the server 110 determines that, under the current configuration of the vehicle, the vehicle trunk and the vehicle cabin do not have sufficient loading capacity to accommodate the new object. Further, the server 110 may determine a series of alternative configurations, such as folding a portion of the rear seat 211-3 (e.g., presented in the form of alternative configuration 225), folding the passenger seat 211-2 (e.g., presented in the form of alternative configuration 226), rearranging the loaded objects (e.g., presented in the form of alternative configuration 227), and rearranging the seating arrangement (e.g., presented in the form of alternative configuration 228), to create sufficient loading capacity for the new object.

According to example embodiments, the server 110 may provide the information associated with the one or more loading recommendations to the UE 120, and the UE 120 may generate one or more GUIs including the diagrams of the one or more loading recommendations (e.g., diagrams of one or more of the FIG. 2A to FIG. 2E), such that the UE 120 may present the GUI(s) to the user 140 thereby providing the loading recommendation(s) thereto.

It is contemplated that the diagrams in FIG. 2A to FIG. 2E are merely examples and the scope of the present disclosure should not be limited thereto. Specifically, according to implementations, the diagrams may illustrate the layout or configuration of a truck, a 2-seater vehicle, a motorcycle, and the like, without departing from the scope of the present disclosure. Further, although the diagrams in FIG. 2A to FIG. 2E each illustrates a top-down view diagram, it is contemplated that, in other example embodiments, a front view diagram, a side view diagram, and the like, may be implemented in a similar manner. In addition, the diagrams may also include one or more additional components (e.g., vehicle doors, windshield, storage compartments, etc.), and the components in the diagrams may be presented in two-dimensional (2D) form, three-dimensional (3D) form, or a combination thereof.

According to example embodiments, based on determining that the vehicle does not have sufficient loading capacity to appropriately accommodate the new object, and there is no alternative configuration available, the server 110 may determine an alternative object(s) or product(s) (e.g., alternative object/product that has similar functionalities but smaller dimensions or lighter weight, alternative object/product that can be disassembled or folded to fit within the available free space, etc.) for which the vehicle has sufficient loading capacity and then present the alternative object(s) or product(s) to the user for his/her consideration. In this regard, the server 110 may perform any suitable operations, such as description matching, online searching, and the like, to determine the alternative object(s) or product(s).

Referring back to FIG. 1, the server 110 may be communicatively coupled to the UE 120 and the vehicle system 130 and be configured to receive information therefrom and provide information thereto. For instance, the server 110 may have one or more application programming interfaces (API) that communicate with one or more applications implemented in the UE 120, thereby automatically obtaining the object information (and the vehicle information, when applicable) from the UE 120 when required or applicable. Similarly, the server 110 may be communicatively coupled to the vehicle system 130 and be configured to obtain the vehicle information therefrom when required or applicable.

The communication among the server 110, the UE 120, and/or the vehicle system 130 may be performed through one or more wired communications and/or one or more wireless communications. For example, the communication may be performed via one or more of: a cellular network (e.g., a fifth generation (5G) network, a sixth generation (6G) network, a long-term evolution (LTE) network, a third generation (3G) network, a code division multiple access (CDMA) network, etc.), a public land mobile network (PLMN), a local area network (LAN), a closed area network (CAN), a wide area network (WAN), a metropolitan area network (MAN), a telephone network (e.g., a Public Switched Telephone Network (PSTN), etc.), a private network, an ad hoc network, an intranet, the Internet, a fiber optic-based network, or the like.

According to example embodiments, the server 110 may further include one or more storage mediums configured to store or record information, such as the received object information and the received vehicle information, the information associated with one or more legal requirements for loading an object on a vehicle, the information associated with the vehicle specification, the information defining the constraints of a vehicle, the current conditions of the vehicle, and any other suitable information which may be utilized by the server 110 to determine and provide one or more loading recommendations.

According to example embodiments, the server 110 may include one or more edge servers located nearby the UE 120 and/or the vehicle system 130, may include one or more central servers located further from the UE 120 and/or the vehicle system 130, or may include a combination of at least one edge server and at least one central server.

Next, descriptions of the UE 120 will be provided. Generally, the UE 120 may be configured to communicatively couple the user 140 to the server 110. For instance, the UE 120 may receive the object information from the user 140 and then provide the object information to the server 110, and may receive the loading recommendation(s) from the server 110 and then provide the loading recommendation(s) to the user 140. As further described below, the UE 120 may include a user interface (UI) module that allows the user 140 to communicate with the server 110. For instance, the UI module of the UE 120 may generate and present a graphical user interface (GUI), such as a chat UI, that allow the user 140 to communicate with the server 110 to provide object information (via inputting the text descriptions into the GUI, etc.) to the server 110. In addition, upon receiving the information associated with the loading recommendation(s) from the server 110, the UI module of the UE 120 may generate and present to the user 140 the GUI that includes the diagram(s), such as one or more of the diagrams illustrated in FIG. 2A to FIG. 2E, that represent the loading recommendation(s).

According to example embodiments, the UE 120 may be utilized by the user 140 to capture an image of the object (e.g., an image of the actual object, an image of the QR code or URL associated with the object, a screenshot associated with the object, etc.) and then upload the captured image to the server 110, such that the server 110 may extract or obtain the object information therefrom. In some example implementations, the UE 120 may also be utilized by the user 140 to capture an image of the vehicle (e.g., an image of the vehicle cabin, an image of the vehicle trunk, an image of the tires conditions, an image of the vehicle specification, etc.) and then upload the captured image to the server 110, such that the server 110 may extract or obtain the vehicle information therefrom.

According to example embodiments, the UE 120 may have one or more software applications implemented therein for managing the object information, the vehicle information (when applicable), and the loading recommendation(s). The one or more software applications may include, for example, a loading recommendation application that includes a chat UI that enables the user 140 to communicate with the server 110 to provide information required for determining the loading recommendation(s), a guidance UI that guides the user 140 to capture the image of the object (and the image of the vehicle, when applicable), and a recommendation UI that presents and illustrates the loading recommendation(s) to the user 140.

According to example embodiments, the UE 120 may include one or more devices or equipment, such as one or more of: a computing device (e.g., a desktop computer, a laptop computer, a tablet computer, a handheld computer, etc.), a mobile device (e.g., a smartphone, a smartwatch, a pair of smart glasses, etc.), a SIM-based device, a camera, or any other suitable device which may be associated with the user 140.

Next, descriptions of the vehicle system 130 will be provided. Generally, the vehicle system 130 may be implemented in a vehicle (e.g., vehicle 210) and be configured to obtain the vehicle information and then provide the same to the server 110. According to example embodiments, the vehicle system 130 may be configured to capture or obtain the vehicle information (e.g., capture the image of the vehicle cabin and/or the image of the vehicle trunk, record the fuel consumption or remaining fuel level, record the total weight or weight distribution of the vehicle, etc.) upon detecting a change in an ignition state of the vehicle. For instance, upon determining that the ignition state of the vehicle is changing or has changed from an ignition on (IG-On) state to an IG-Off state (i.e., indicating that the vehicle is stopping and the user(s) are leaving the vehicle), the vehicle system 130 may capture or obtain the vehicle information such that the most recent vehicle conditions before the user(s) leaving the vehicle can be obtained and be provided to the server 110 for the determination of the loading recommendation.

According to example embodiments, the vehicle system 130 may interoperate with one or more systems or components implemented in the vehicle to obtain the vehicle information. For instance, the vehicle system 130 may interoperate with an interior and cargo camera system (which captures and provides images of the vehicle cabin and the vehicle trunk), an occupant posture detection sensor (which detects the pressure, weight and temperature of the seat to check whether occupants or objects are on board), a navigation system (which provides location information of the vehicle, information associated with a route that the vehicle will take to reach a target destination which may in turn affect the temperature inside the vehicle cabin and/or the vehicle trunk, the centrifugal forces on the loaded objects, the effect of pitch on loaded objects, and the like), air conditioning system (which monitors and controls the temperature and humidity inside the vehicle cabin and/or the vehicle trunk), a suspension system (which provides information of the current weight and weight distribution of the vehicle), an ignition control system (which provides information of vehicle ignition state), an electronic control unit (ECU) associated with various vehicle functionalities (e.g., fuel management, transmission control, stability control, etc.), and the like.

According to example embodiments, the vehicle system 130 may be configured to continuously (or periodically) provide the location information of the vehicle to the server 110, and the server 110 may automatically obtain and update the legal requirements associated with the vehicle based on the local legal requirements associated with the most recent location of the vehicle. In some example embodiments, the vehicle system 130 may be configured to provide the information on which route the vehicle will take to reach its destination to the server 110, and the server 110 may obtain and update the legal requirements based on the local legal requirements associated with the route in advance.

Next, example components and functional modules constituting the server 110, the UE 120, and the vehicle system 130, as well as the operations associated therewith, are described below with reference to FIG. 3A to FIG. 3E.

Figure 3A:
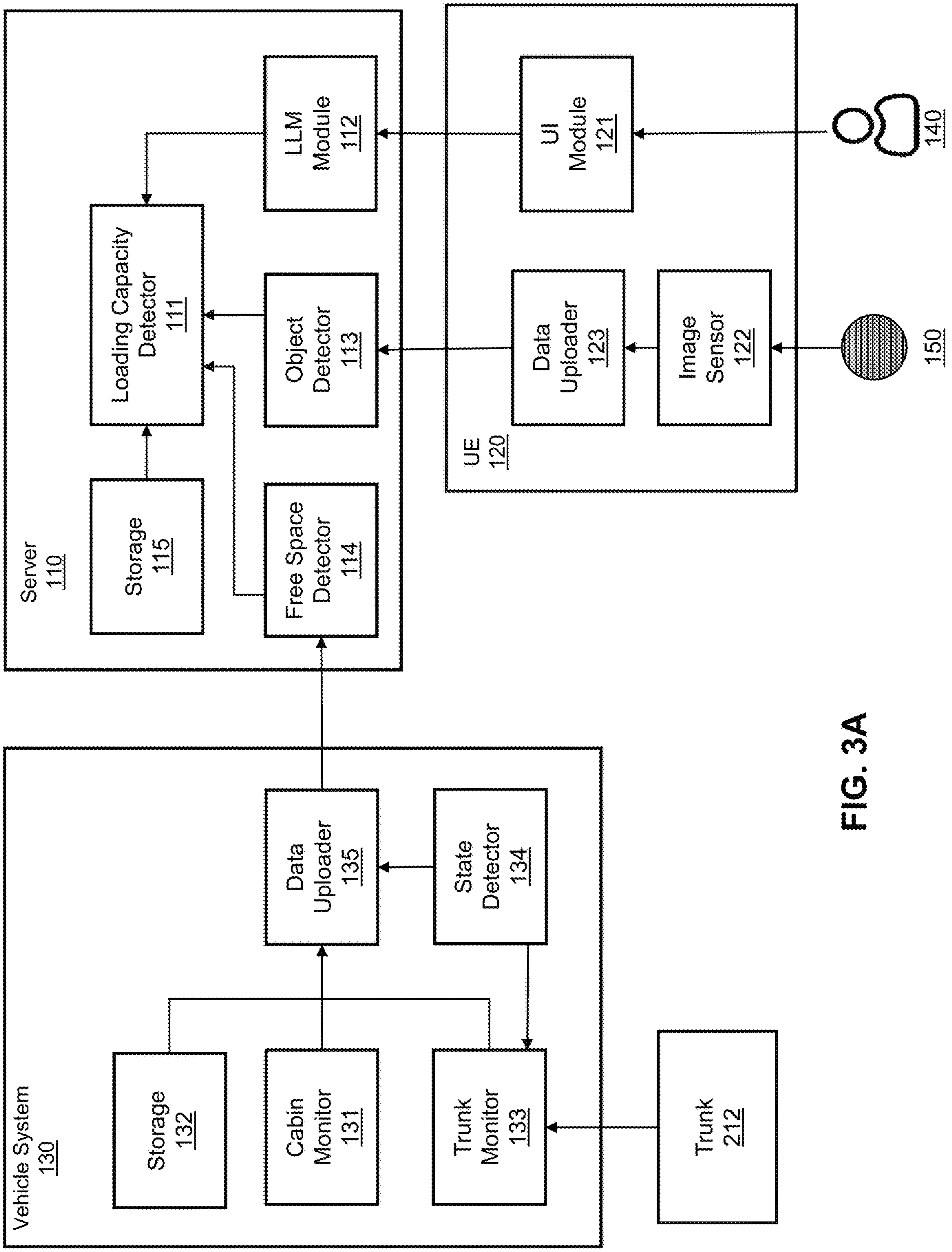
FIG. 3A to FIG. 3E each illustrates a diagram of a respective configuration of the server, the UE, and the vehicle system, according to one or more example embodiments.

FIG. 3A illustrates a block diagram of a first example configuration of the server 110, the UE 120, and the vehicle system 130, according to one or more example embodiments. As illustrated in FIG. 3A, each of the server 110, the UE 120, and the vehicle systems 130 may include a plurality of functional modules or components, each of which may be implemented in different forms of hardware, firmware, or a combination of hardware and software. In this regard, it is contemplated that one or more operations described herein with reference to each of the modules or components may be performed by a hardware (e.g., a processor, etc.) upon executing a software or computer-executable instructions for implementing the modules or components. Further, it is contemplated that one or more of the modules or components may be consolidated into a single module and/or more/less modules or components than illustrated in FIG. 3A may be utilized, without departing from the scope of the present disclosure.

In the example of FIG. 3A, the user 140 would like to determine whether or not the vehicle has sufficient loading capacity for accommodating the object 150 after leaving the vehicle (in which the vehicle system 130 is implemented). By way of example, the user 140 may park the vehicle at a parking area of a shopping mall and unexpectedly encounter the object 150 when walking in the shopping mall. Before purchasing the object 150, the user 140 would like to ensure that the vehicle has sufficient loading capacity for appropriately accommodating the object 150, without violating the local traffic regulations or legal requirements. In this regard, the user 140 may utilize the UE 120 to provide the object information associated with the object 150 to the server 110.

In this example use case, the UE 120 includes a UI module 121, an image sensor 122, and a data uploader 123.

The user 140 may utilize a camera application implemented in the UE 120 that activates the image sensor 122 to capture one or more images of the object 150 (e.g., the image of the actual object 150 from one or more angles, the image of the product catalog of the object 150, quick-response (QR) code associated with the object 150, etc.) Accordingly, the captured image(s) will be uploaded by the data uploader 123 to the server 110. According to example embodiments, in addition to capturing the image(s) of the object 150, the user 140 may also input the text describing the object 150 (e.g., product ID of the object 150, manufacturer of the object 150, name of shop in which the object 150 is presented, size or dimension of the object 150, etc.) via one or more GUIs generated and presented by the UI module 121. In some example embodiments, the server 110 may first attempt to utilize the information extracted or obtained from the image(s) uploaded by the data uploader 123, and then request the user 140 to provide additional object information when required.

Referring still to FIG. 3A, the vehicle system 130 may include a cabin monitor 131, a storage 132, a truck monitor 133, a state detector 134, and a data uploader 135, which may be configured to interoperate with each other to provide vehicle information (examples of the vehicle information have been described above with reference to FIG. 1) to the free space detector 114 of the server 110.

The state detector 134 (or a component configured to implement the detector 134) may be configured to detect a state change of the vehicle and then trigger the processes of the collection and provision of the vehicle information based thereon. According to example embodiments, the state detector 134 may interoperate with the ignition control system of the vehicle to obtain information of the ignition state (e.g., IG-On, IG-Off, etc.) and detect a change of the ignition state based thereon. In this regard, based on determining the vehicle is entering or has entered the IG-Off state from the IG-On state, the state detector 134 may send a trigger or instruction to the trunk monitor 133 and the data uploader 135 to initiate the processes for collecting the vehicle information. In some example implementations, the state detector 134 may further send the trigger or instruction to the cabin monitor 131 and the storage 132. According to example embodiments, in addition to or in alternative to the ignition state of the vehicle, the state detector 134 may also be configured to detect other states of the vehicle, such as an engine running state, a parking state, a driving state, and the like, and then trigger the processes for collecting the vehicle information based thereon.

The data uploader 135 (or a component configured to implement the data uploader 135) may be configured to collect the vehicle information from the cabin monitor 131, the storage 132, and the trunk monitor 133, upon receiving the trigger or instructions from the state detector 134. Upon receiving the vehicle information, the data uploader 135 may upload or provide the vehicle information to the free space detector 114 of the server 110.

The cabin monitor 131 (or a component configured to implement the monitor 131) may be configured to monitor and capture the conditions of the vehicle cabin (e.g., cabin 211) and then provide the captured information to the data uploader 135. According to example embodiments, the cabin monitor 131 may interoperate with one or more interior cameras (implemented within the vehicle cabin) to obtain one or more images in the vehicle cabin when the vehicle changes a state (e.g., when the vehicle changes from IG-On state to IG-Off state, etc.) Accordingly, the cabin monitor 131 may obtain the most recent conditions in the vehicle cabin (e.g., number of passengers, seat arrangements, object(s) loaded in the vehicle cabin, etc.) and then provide the same to the server 110 for the determination of the loading recommendation(s).

The storage 132 (or a component configured to implement the storage 132) may be configured to store information associated with the vehicle ID (e.g., license plate number, vehicle identification number (VIN), vehicle chassis number, etc.), information associated with the vehicle type (e.g., sedan, truck, motorcycle, etc.), and the like, and then provide the stored information to the data uploader 135 when required.

The trunk monitor 133 (or a component configured to implement the monitor 133) may be configured to monitor and capture the conditions of the vehicle trunk 212 and then provide the captured information to the data uploader 135. According to example embodiments, the trunk monitor 133 may interoperate with one or more cargo or trunk cameras (implemented within the trunk 212) to obtain one or more images in the vehicle trunk when the vehicle changes a state (e.g., when the vehicle changes from IG-On state to IG-Off state, etc.) Accordingly, the trunk monitor 133 may obtain the most recent conditions in the vehicle trunk (e.g., object(s) loaded in the vehicle cabin, etc.) and then provide the same to the server 110 for the determination of the loading recommendation(s). According to embodiments, the trunk monitor 133 may perform the operation(s) for capturing the conditions of the vehicle trunk 212, upon receiving the trigger or instructions from the state detector 134.

Referring still to FIG. 3A, the server 110 may include a loading capacity detector 111, an LLM module 112, an object detector 113, a free space detector 114, and a storage 115, which may constitute the loading recommendation system described above with reference to FIG. 1. The loading capacity detector 111 (or a component configured to implement the detector 111) may be configured to receive data or information from the LLM module 112, the object detector 113, the free space detector 114, and the storage 115, and then determine whether or not the vehicle has sufficient loading capacity for appropriately accommodating the object 150, without violating any traffic regulations or legal requirements. Accordingly, the loading capacity detector 111 may determine and provide one or more loading recommendations to the user 140 (via the UE 120), wherein the loading recommendation(s) may include a positioning or loading of the object 150 in one or more free space in the vehicle, one or more alternative configurations of the vehicle (e.g., the folding of the rear seats, the folding of the passenger seat, the rearrangement of the loaded objects and/or seating arrangement, etc.), and/or one or more alternative objects/products. In some example embodiments, the loading recommendation(s) may include the information associated with the amount of ice or dry ice (e.g., grams, kilograms, etc.) required to keep the temperature of the object below the temperature requirement until the vehicle reaches to a destination. In some example embodiments, the loading recommendation(s) may include the information associated with the type of packaging that needs to be used to avoid or limit damage to the object which may be caused by centrifugal forces and pitch until the vehicle reaches the destination.

The specific operations of determining and providing the one or more loading recommendations are described above with reference to FIG. 1 to FIG. 2E. Thus, redundant descriptions associated therewith may be omitted below for conciseness. Example operations associated with the LLM module 112, the object detector 113, the free space detector 114, and the storage 115, are provided in the following The LLM module 112 (or a component configured to implement the module 112) may receive, from the UI module 121 of the UE 120, texts describing the object 150, and then perform one or more NLP operations to extract the object information therefrom. According to embodiments, the LLM module 112 may execute or utilize one or more artificial intelligence (AI)/machine learning (ML) models to perform one or more operations described herein. The one or more AI/MI models may include: one or more transformer models, one or more recurrent neural network (RNN) models, one or more embeddings from language models (ELMo), and/or any other suitable type of models trained based on any other suitable learning architectures. According to example embodiments, the LLM module 112 may be requested by the loading capacity detector 111 to obtain additional object information (e.g., descriptions of the characteristic of the object 150, product ID of the object 150, etc.) from the user 140. In this case, the LLM module 112 may engage the user 140 via, for example, a chat UI generated and presented by the UI module 121, thereby requesting the required additional information from the user 140. Upon obtaining or extracting the required information, the LLM module 112 may provide the obtained information to the loading capacity detector 111 for further processing or utilization.

The object detector 113 (or a component configured to implement the detector 113) may be configured to receive one or more images (or data associated therewith) from the data uploader 123 of the UE 120, and then detect or identify one or more objects of interest in the one or more images. Specifically, the object detector 113 may be configured to perform one or more computer vision operations and/or one or more image processing operations to detect and extract the object information (e.g., size or dimension of the object 150, category of the object 150, QR code attached to the object 150, etc.) from the one or more images. For instance, the object detector 113 may perform one or more operations such as bounding box (BBOX) detection, semantic segmentation, instance segmentation, panoptic segmentation, edge detection, histogram analysis, shape or texture detection, and the like, to identify and obtain the object information of interest from the image(s). According to example embodiments, the object detector 113 may be configured to process the image(s) to calibrate a relationship between pixels in the image(s) and the object 150, calculate the size of the object 150 in pixels, and then convert the size of the object 150 in an appropriate measurement unit (e.g., cm, m, etc.) Further, the object detector 113 may also perform other suitable operations, such as image quality enhancement (e.g., noise reduction, image smoothing, etc.), feature extraction, scale invariance, and the like, without departing from the scope of the present disclosure. Upon obtaining or extracting the required object information (examples of the object information have been described above with reference to FIG. 1), the object detector 113 may provide the obtained information to the loading capacity detector 111 for further processing or utilization.

The free space detector 114 (or a component configured to implement the module 114) may be configured to receive vehicle information from the data uploader 135 of the vehicle system 130, and then determine a free space in the vehicle based thereon. According to example embodiments, the received vehicle information may include one or more images (or data associated therewith) of the vehicle cabin and the vehicle trunk. In this case, the free space detector 114 may perform one or more computer vision operations and/or one or more image processing operations such as bounding box (BBOX) detection, semantic segmentation, instance segmentation, panoptic segmentation, edge detection, histogram analysis, shape or texture detection, and the like, to detect and extract the vehicle information (e.g., number of users, seat arrangement, number of loaded objects, size of loaded objects, etc.) from the one or more images. In addition to the images of the vehicle cabin and vehicle trunk, the received vehicle information may include information, such as vehicle ID and/or the like, that enables the free space detector 114 to identify the vehicle and obtain the associated vehicle specification based thereon. Upon obtaining or extracting the required vehicle information (examples of the vehicle information have been described above with reference to FIG. 1), the free space detector 114 may utilize said information to determine a free space in the vehicle, and then provide the free space information to the loading capacity detector 111 for further processing or utilization.

The storage 115 (or a component configured to implement the storage 115) may be configured to obtain and store information such as information associated with traffic regulations or legal requirements for loading an object on the vehicle, information associated with the vehicle specification (that defines the dimension of the vehicle cabin and vehicle truck as well as alternative configurations of the vehicle), and the like. The storage 115 may provide the stored information to the loading capacity detector 111 when required. According to example embodiments, the storage 115 may continuously (or periodically) obtain the latest information and update the stored information accordingly. Further, the storage 115 may obtain the information associated with the traffic regulations or legal requirements for a plurality of intermediate points on the route to the destination.

Figure 3B:
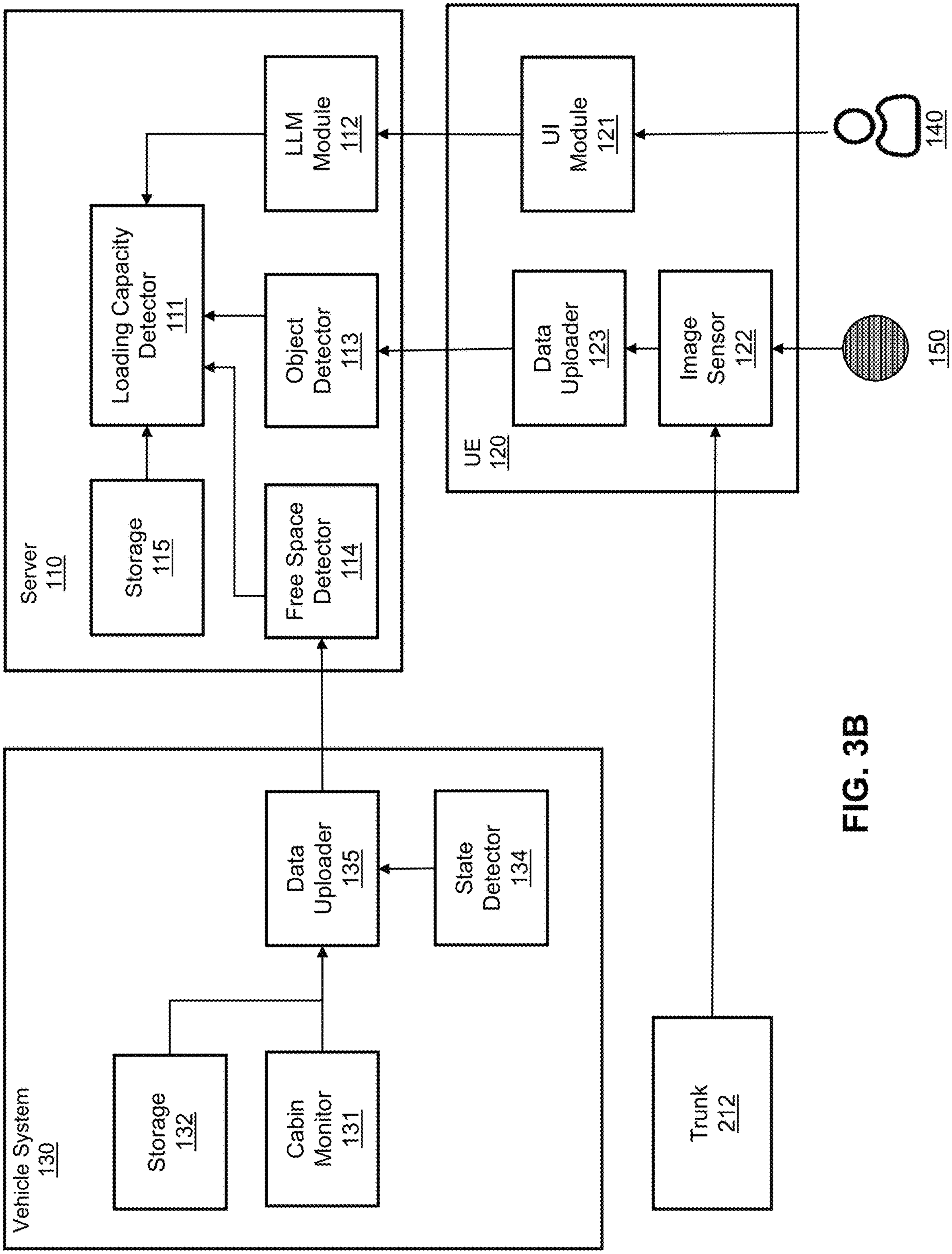

Referring next to FIG. 3B, which illustrates a block diagram of a second example configuration of the server 110, the UE 120, and the vehicle system 130, according to one or more example embodiments. As illustrated in FIG. 3B, each of the server 110, the UE 120, and the vehicle systems 130 may include one or more functional modules or components similar to those described above with reference to FIG. 3A. Thus, redundant descriptions associated therewith may be omitted below for conciseness. The example configuration of FIG. 3B is different from FIG. 3A in that, the vehicle system 130 in FIG. 3B does not require the trunk monitor 133 of the FIG. 3A. Instead, the condition of the trunk 212 is captured by the UE 120 when the user 140 leaves the vehicle. In this regard, the UE 120 may first upload the image(s) of the trunk 212 to the server 110 when the user 140 leaves the vehicle, and then upload the image(s) of the object 150 at a later time. In some example embodiments, a first passenger of the vehicle who have already left the vehicle (e.g. for shopping) may a second passenger remaining in the vehicle to take and upload the image(s) of the trunk 212 to the server 110, and then the first passenger may upload may the image(s) of the object 150 to server 110.

Figure 3C:
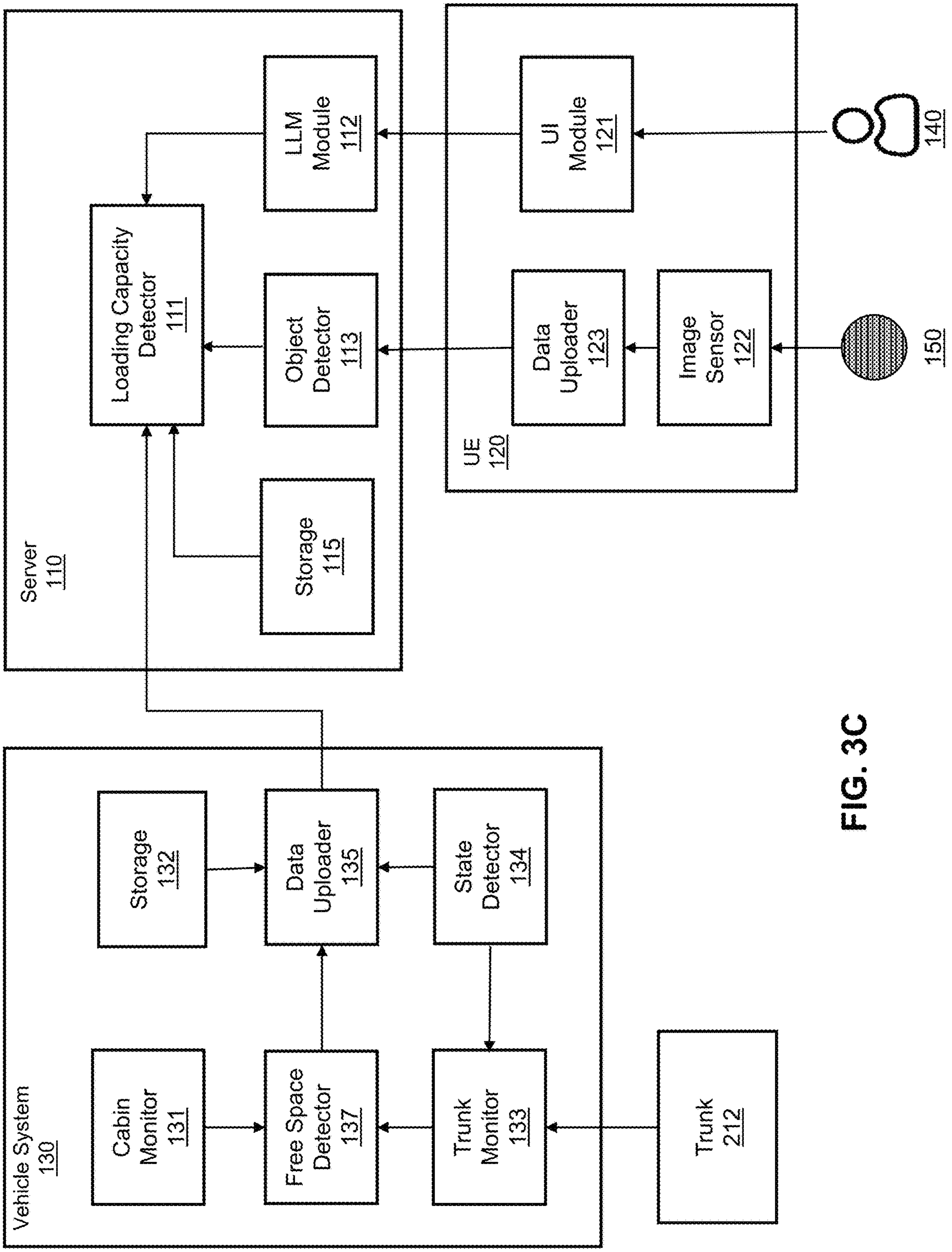

Referring next to FIG. 3C, which illustrates a block diagram of a third example configuration of the server 110, the UE 120, and the vehicle system 130, according to one or more example embodiments. As illustrated in FIG. 3C, each of the server 110, the UE 120, and the vehicle systems 130 may include one or more functional modules or components similar to those described above with reference to FIG. 3A. Thus, redundant descriptions associated therewith may be omitted below for conciseness. The example configuration of FIG. 3C is different from FIG. 3A in that, the free space detector in FIG. 3C is implemented in the vehicle system 130 (illustrated as "free space detector" 137) instead of being implemented in the server 110. Namely, the operations of determining a free space in the vehicle are being performed at the vehicle system 130 instead of at the server 110, and the vehicle system 130 may provide the associated information to the server 110 thereafter.

Figure 3D:
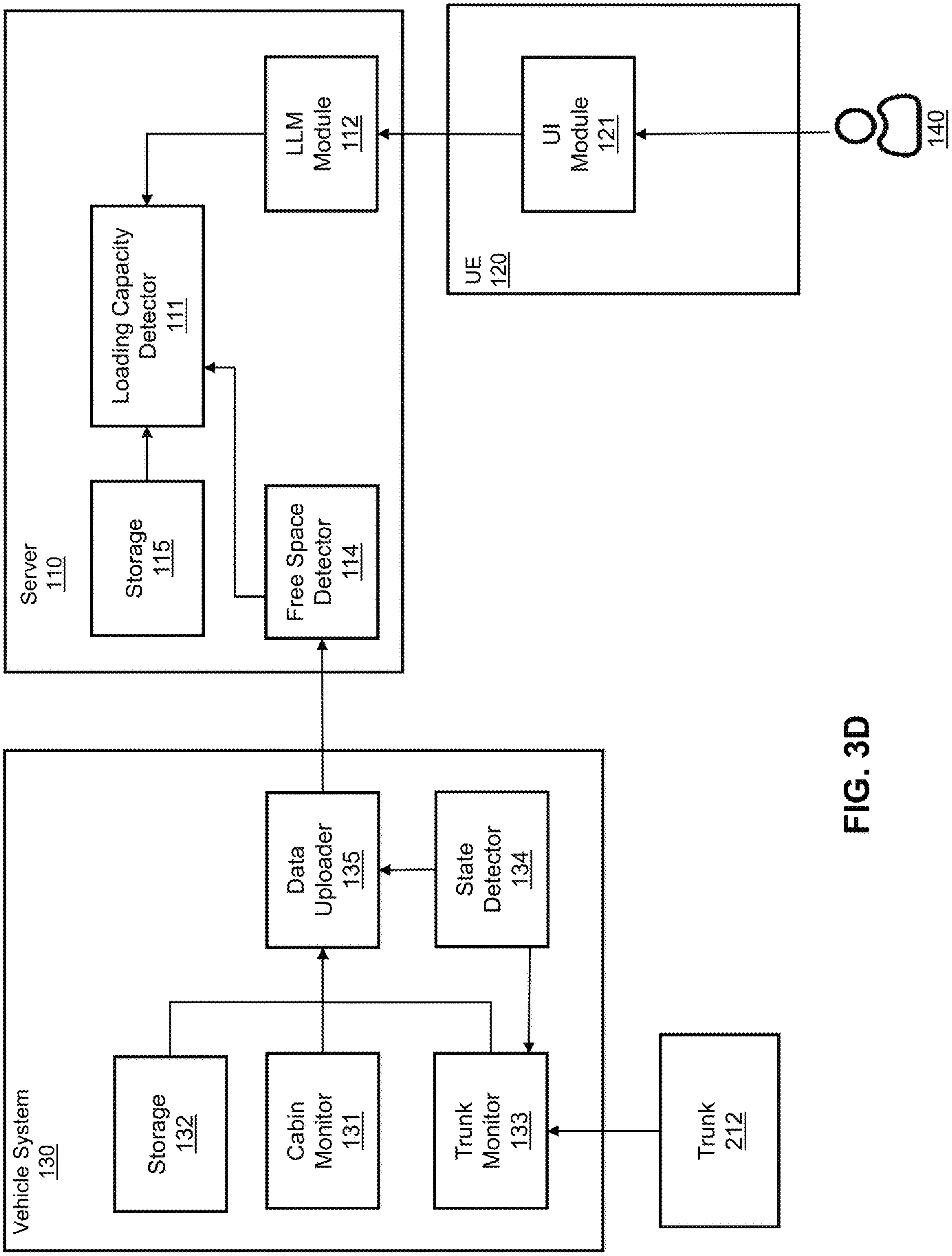

Referring next to FIG. 3D, which illustrates a block diagram of a fourth example configuration of the server 110, the UE 120, and the vehicle system 130, according to one or more example embodiments. As illustrated in FIG. 3D, each of the server 110, the UE 120, and the vehicle systems 130 may include one or more functional modules or components similar to those described above with reference to FIG. 3A. Thus, redundant descriptions associated therewith may be omitted below for conciseness. The example configuration of FIG. 3D is different from FIG. 3A in that, the UE 120 in FIG. 3D does not require the image sensor 122 and the data uploader 123 of the FIG. 3A. In this case, the user 140 may simply provide the object information by inputting the texts describing the object via a GUI (e.g., chat UI) generated and provided by the UI module 121. This example embodiment may be utilized when the user 140 does not have access to the actual object.

Figure 3E:
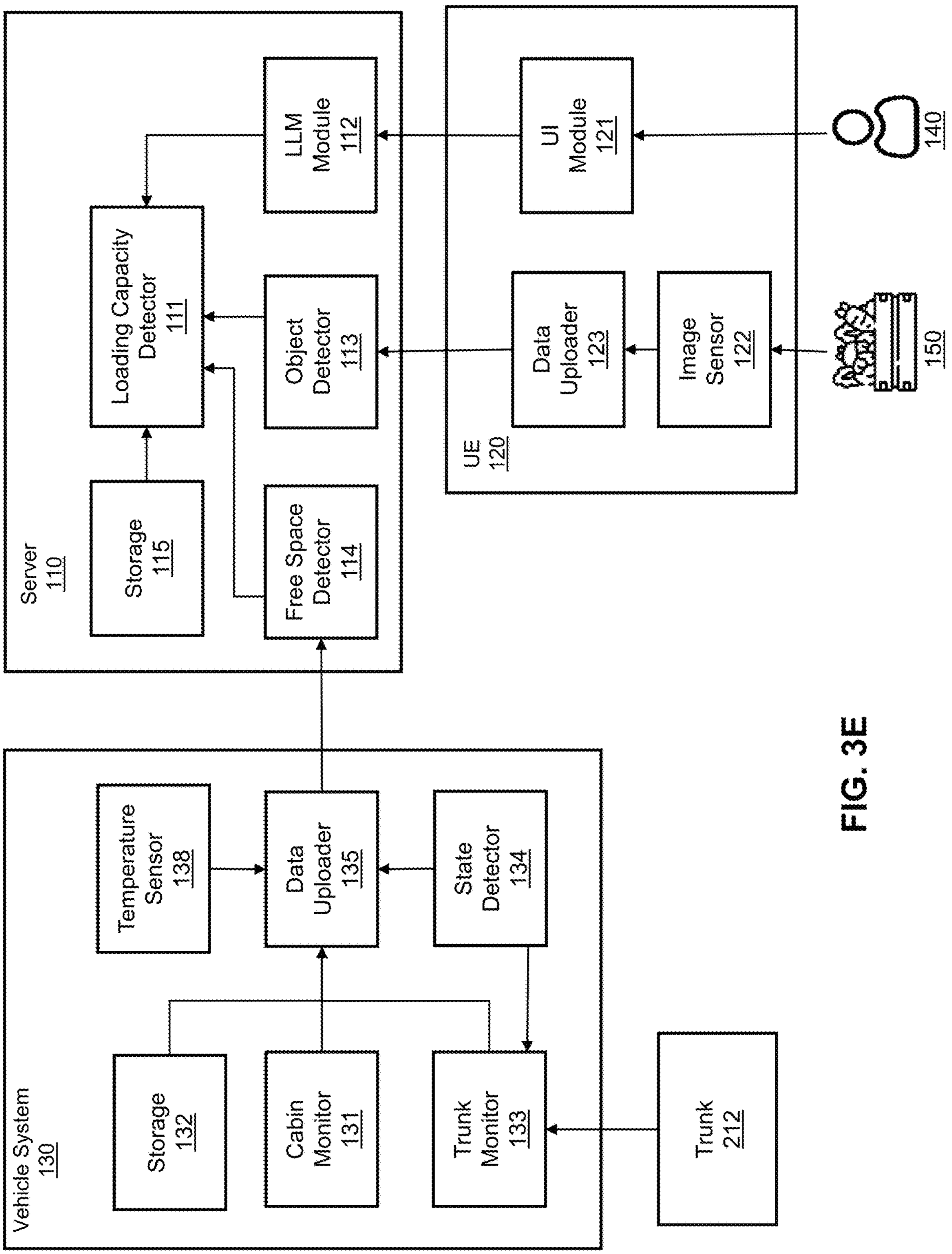

Referring next to FIG. 3E, which illustrates a block diagram of a fifth example configuration of the server 110, the UE 120, and the vehicle system 130, according to one or more example embodiments. As illustrated in FIG. 3E, each of the server 110, the UE 120, and the vehicle systems 130 may include one or more functional modules or components similar to those described above with reference to FIG. 3A. Thus, redundant descriptions associated therewith may be omitted below for conciseness. The example configuration of FIG. 3D is different from FIG. 3A in that, the object 150 is temperature-sensitive (e.g., groceries), and the vehicle system 130 includes an additional temperature sensor 138 which may be configured to measure and provide the temperature information of the vehicle cabin and the trunk 212 to the server 110, such that the server 110 may take the temperature information into consideration when determining the loading recommendation(s). In some example embodiments, the vehicle system 130 may obtain a forecast of the temperature on the route to reach the destination based on, for example, one or more inputs from a weather forecast system that predict the future temperature (e.g., temperature along the upcoming route, temperature in the vehicle cabin and the vehicle trunk in the upcoming hours, etc.)

Figure 4:
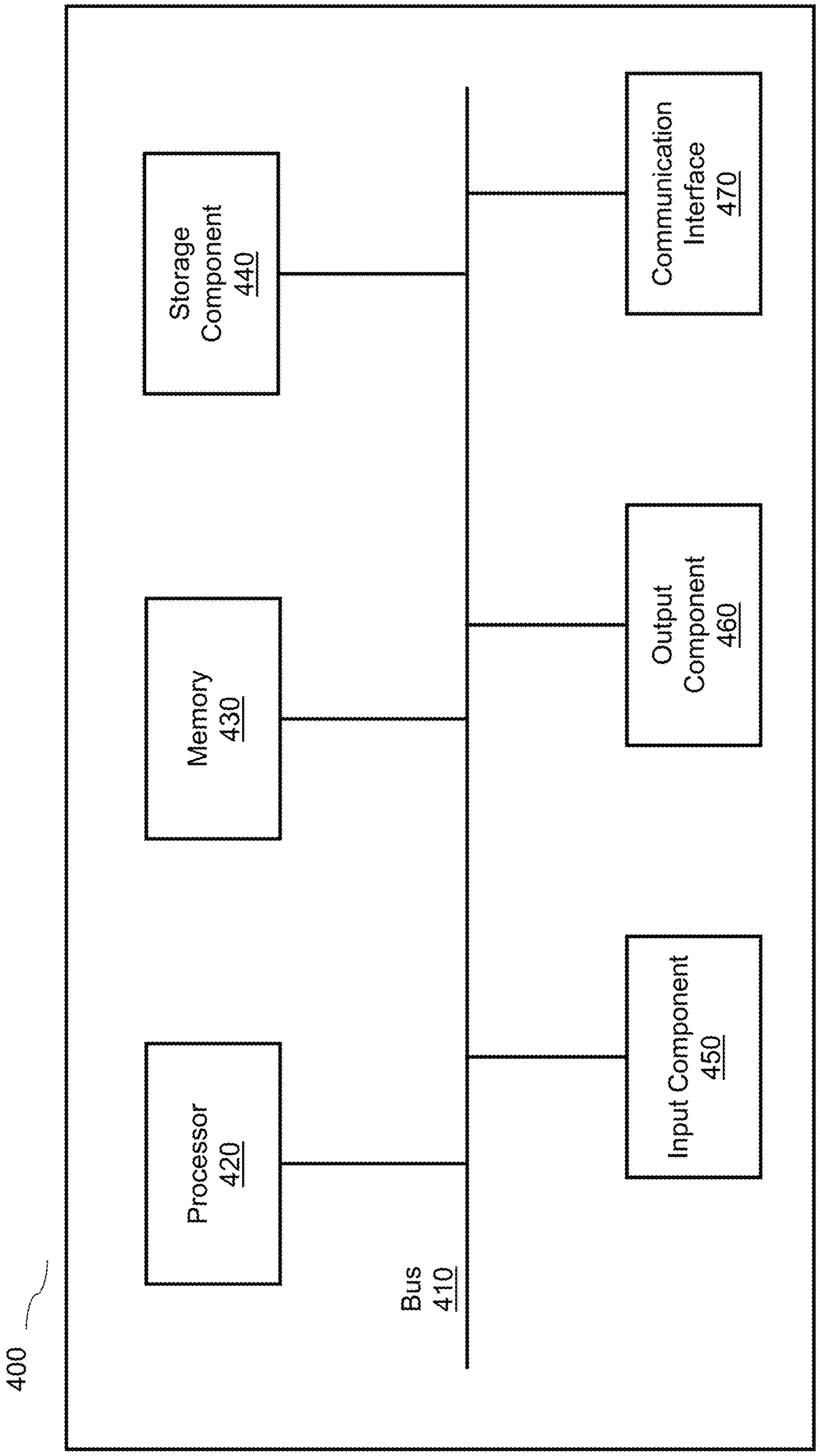
FIG. 4 illustrates a block diagram of a generic hardware system which may be implemented in the server, the UE, and/or the vehicle, according to one or more embodiments.

Next, descriptions of example components for implementing one or more of the described operations are provided with reference to FIG. 4. Specifically, FIG. 4 illustrates a block diagram of a generic hardware system 400, according to one or more example embodiments. The hardware system 400 may be implemented in the server 110 to perform one or more operations of the server 110, may be implemented in the UE 120 to perform one or more operations of the UE 120, and may be implemented in the vehicle to perform one or more operations of the vehicle system 130. In this regard, it is contemplated that one or more of the modules/components of the server 110, the UE 120, and the vehicle system 130, as illustrated in one or more of FIG. 3A to FIG. 3E, may be implemented by one or more components of the hardware system 400.

As illustrated in FIG. 4, the system 400 may include at least one bus 410, at least one processor 420, at least one memory 430, at least one storage component 440, at least one input component 450, at least one output component 460, and at least one communication interface 470. It is contemplated that the system 400 may include more or less components than illustrated in FIG. 4, without departing from the scope of the present disclosure. For instance, in some embodiments, the system 400 may include a plurality of storage components 440, and the like.

The at least one bus 410 may include one or more components that permit communication among the components of system 400. For instance, when the system 400 is implemented in the server 110, the bus 410 may include an Ethernet bus, a front side bus (FSB), a system bus, a memory bus, a peripheral component interconnect (PCI) bus, and any other suitable types of bus that allow the components of the system 400 to communicate with each other and to communicate with other components of the server 110. Further, when the system 400 is implemented in the UE 120, the bus 410 may alternatively or additionally include a universal serial bus (USB), an inter-integrated circuit (I2C) bus, a serial peripheral interface (SPI) bus, and any other suitable types of bus that allow the components of the system 400 to communicate with each other and to communicate with other components of the UE 120. Furthermore, when the system 400 is implemented in the vehicle, the bus 410 may alternatively or additionally include a controller area network (CAN) bus, a local interconnect network (LIN) bus, and any other suitable types of bus that allow components of the vehicle system, actuators, ECUs, and the like, to communicate with each other.

The at least one processor 420 may be implemented in hardware, firmware, or a combination of hardware and software. According to embodiments, the processor 420 may include a central processing unit (CPU), a graphics processing unit (GPU), a tensor processing unit (TPU), an accelerated processing unit (APU), a microprocessor, a microcontroller, a digital signal processor (DSP), a field-programmable gate array (FPGA), an application-specific integrated circuit (ASIC), and/or another type of processing or computing component. In some example implementations, the processor 420 may include one or more processors capable of being programmed to perform one or more operations described herein. Further, the processor 420 may include a plurality of processing units, each of which is dedicated to performing a specific operation (e.g., each of the modules/components in FIG. 3A to FIG. 3E may be assigned a dedicated processing unit, etc.)

The at least one memory 430 may include a random access memory (RAM), a read-only memory (ROM), and/or another type of dynamic or static storage device (e.g., a flash memory, a magnetic memory, and/or an optical memory) that stores information and/or instructions for use by the processor 420. The at least one storage component 440 may store information and/or software related to the operation and use of the system 400. For example, the storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

According to embodiments, the storage component 440 may be configured to store computer-readable or computer-executable instructions for implementing one or more modules or components of the server 110/the UE 120/the vehicle system 130, one or more LLM or AI/ML models (when the system 400 is implemented in the server 110), information associated with the traffic regulations or legal requirements (when the system 400 is implemented in the server 110), information associated with the vehicle specification (when the system 400 is implemented in the server 110), vehicle information and object information received by the server 110 (when the system 400 is implemented in the server 110), information associated with the vehicle ID (when the system 400 is implemented in the vehicle system 130), information associated with the vehicle type (when the system 400 is implemented in the vehicle system 130), one or more historical operations performed by processor 420, one or more user interfaces (e.g., GUIs, chat UIs, etc.) provided to the user, and/or the like. The storage component 440 may provide the stored information to the memory 430 for the execution of the processor 420.

The at least one input component 450 may include one or more input components that receive information from external components or users. For instance, when the system 400 is implemented in the UE 120, the input component 450 may include a touchscreen display, a keyboard, a keypad, a mouse, a button, a switch, a microphone, and/or any other suitable component that enable the UE 120 to receive object information, such as via user input, from the user 140. Further, when the system 400 is implemented in the server 110, the input component 450 may include similar components as described above, which enable the server 110 to receive information (e.g., information of vehicle specification, information of traffic regulations or legal requirements, LLM or AI/ML models, etc.) therefrom. Furthermore, when the system 400 is implemented in the vehicle, the input component may additionally include one or more onboard sensors configured to detect, measure, and capture respective sensing data. For instance, the input component may include one or more of: an image sensor (e.g., camera, etc.) which detects and captures images (e.g., images of the vehicle cabin and trunk, etc.); a temperature sensor which measures and captures data associated with the temperature inside the vehicle cabin and the trunk; a location sensor (e.g., a global positioning system (GPS) receiver, an inertial measurement unit (IMU), etc.) which measures and captures data associated with the location, position, and/or orientation of the vehicle; and any other sensors suitable to be deployed in the vehicle.

The at least one output component 460 may include one or more output components that provide output information from the system 400. For instance, when the system 400 is implemented in the UE 120, the output component 460 may include a display, a speaker, a navigation device, one or more light-emitting diodes (LEDs), and any other suitable component that output the GUI/chat UI to the user 140. It is contemplated that the server 110 and/or the vehicle system 130 may also include similar output component(s).

The at least one communication interface 470 may include a transceiver-like component (e.g., a transceiver and/or a separate receiver and transmitter) that enables the system 400 to communicate with other devices, such as via a wired connection, a wireless connection, or a combination of wired and wireless connections. Communication interface 470 may permit system 400 to receive information from one or more devices outside the system 400 and/or provide information thereto. For example, communication interface 470 may include an Ethernet interface, an optical interface, a coaxial interface, an infrared interface, a radio frequency (RF) interface, a universal serial bus (USB) interface, a Wi-Fi interface, a cellular network interface, or the like. According to one or more embodiments, the communication interface 470 may include at least one input/output (I/O) interface, at least one network interface, at least one sensor interface, at least one storage interface, and/or the like, that enable the components 420-460 to communicate with other devices outside of the vehicle. Further, the communication interface 470 may include one or more APIs that allow the system 400 (or one or more components included therein) to communicate with one or more software applications (e.g., software application deployed in the server 110, the UE 120, and the vehicle system 130, etc.)

System 400 may perform one or more operations described herein in response to the at least one processor 420 executing computer-executable instructions. These computer-executable instructions may be stored by a non-transitory computer-readable recording medium, such as memory 430 and/or storage component 440. A computer-readable medium is defined herein as a non-transitory memory device. A memory device may include memory space within a single physical storage device or memory space spread across multiple physical storage devices.

Figure 5:
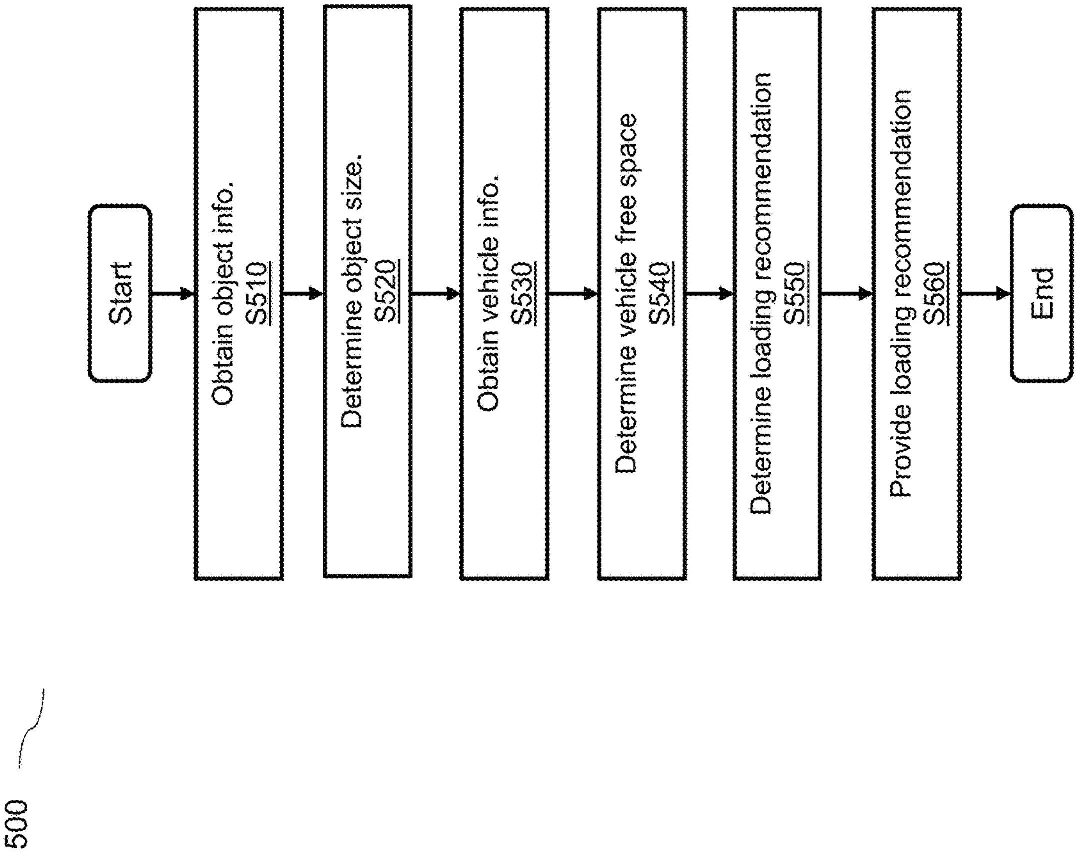
FIG. 5 illustrates a flow diagram of an example method for providing at least one loading recommendation to a user, according to one or more example embodiments.

Computer-executable instructions (e.g., software instructions, etc.) may be read into memory 430 and/or storage component 440 from another computer-readable medium or from another device (e.g., a remote server, an external storage, etc.) via the communication interface 470. When executed, the computer-executable instructions stored in memory 430 and/or storage component 440 may cause the processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software FIG. 5 illustrates a flow diagram of an example method 500 for providing at least one loading recommendation to a user, according to one or more example embodiments. The method 500 may be performed by at least one processor (e.g., processor 420) of a system implemented in the server 110, upon executing the associated computer-instructions stored in at least one memory storage (e.g., memory 430, storage component 440, etc.) of the system.

Referring to FIG. 5, at operation S510, the at least one processor of the server 110 may be configured to obtain, from a UE associated with the user (e.g., UE 120), information associated with an object ("first information" herein). The first information may include an image of the object, a description of the object, and the like. The specific operations for obtaining the object information/first information have been described above with reference to FIG. 1 and FIG. 3A to FIG. 3E, thus redundant descriptions associated therewith may be omitted below for conciseness.

At operation S520, the at least one processor of the server 110 may be configured to determine, based on the first information, a size of the object. According to embodiments in which the first information includes at least one image of the object, the at least one processor may perform one or more computer vision operations and/or one or more image processing operations to determine the size of the object based on the at least one image. For instance, the at least one processor may process the at least one image to calibrate a relationship between pixels in the at least one image and the object, calculate the size of the object in pixels, and then convert the size of the object into an appropriate measurement unit (e.g., cm, m, etc.). As another example, the at least one processor may perform the one or more computer vision operations and/or the one or more image processing operations to determine the category of the object, such as grocery, perishable foods, frozen food, other fragile object, furniture, and the like.

According to example embodiments in which the first information includes texts or descriptions associated with the object, the at least one processor may perform one or more NLP operations to obtain the information associated with the size of the object. For instance, the at least one processor may determine, from the texts/descriptions, a product ID, an URL to the product website of the object, and the like. In this case, the at least one processor may obtain, from a database (e.g., an internet server, etc.) based on the product ID or URL included in the texts/descriptions, information associated with the size of the object. As another example, the at least one processor may utilize an LLM to process the texts/descriptions thereby extracting the information associated with the size of the object therefrom.

The specific operations for determining the size of the object have been described above with reference to FIG. 1 and FIG. 3A to FIG. 3E, thus redundant descriptions associated therewith may be omitted below for conciseness.

At operation S530, the at least one processor of the server 110 may be configured to obtain, from a vehicle system implemented in the vehicle (e.g., vehicle system 130), information associated with the vehicle ("second information" herein). The second information may include at least one image of a vehicle trunk, at least one image of a vehicle cabin, information from occupant posture detection sensor, or the combination thereof. The second information may be obtained by the vehicle system upon detecting a change in an ignition state of the vehicle (e.g., when the vehicle changes from IG-On state to IG-Off state, etc.). The specific operations for obtaining the vehicle information/second information have been described above with reference to FIG. 1 and FIG. 3A to FIG. 3E, thus redundant descriptions associated therewith may be omitted below for conciseness.

At operation S540, the at least one processor of the server 110 may be configured to determine, based on the second information, a free space in the vehicle. The specific operations for determining the free space have been described above with reference to FIG. 1 and FIG. 3A to FIG. 3E, thus redundant descriptions associated therewith may be omitted below for conciseness.

It is contemplated that the operations S510 to S540 may be performed in any suitable sequence, without departing from the scope of the present disclosure. For instance, the at least one processor of the server 110 may first perform operations S530 and S540 to obtain the vehicle information/second information and determine the free space based thereon, and then perform operations S510 and S520 at a later time to obtain the object information/first information and determine the size of the object based thereon.

Upon determining the size of the object and the free space in the vehicle, the method 500 may proceed to operation S550, at which the at least one processor of the server 110 may be configured to determine, based on the size of the object and the free space in the vehicle, the at least one loading recommendation. Specifically, the at least one processor may determine, based on the size of the object and the free space in the vehicle, whether or not the vehicle has sufficient loading capacity for accommodating the object, and then determine the at least one loading recommendation based thereon. In some example embodiments, the at least one processor may determine the at least one loading recommendation based on the category of the object, in addition to the size of the object and the free space in the vehicle.

For instance, based on determining that the vehicle has the sufficient loading capacity, the at least one processor may determine at least one position for loading the object within the free space and including the information of the at least one position in the at least one loading recommendation. Further, based on determining that the vehicle does not have the sufficient loading capacity, the at least one processor may determine whether or not at least one alternative configuration of the vehicle for creating the sufficient loading capacity is available. In this regard, based on determining that the at least one alternative configuration is available, the at least one processor may determine at least one position for loading the object within the alternative configuration and including the information of the at least one position and the at least one alternative configuration in the at least one loading recommendation. On the other hand, based on determining that the at least one alternative configuration is not available, the at least one processor may determine whether or not at least one alternative object (e.g., an object that can be accommodated within the free space, etc.) is available. In this regard, based on determining that the at least one alternative object is available, the at least one processor may include the information of the at least one alternative object in the at least one loading recommendation.

According to example embodiments, the at least one processor of the server 110 may be configured to determine whether or not the vehicle has sufficient loading capacity by comparing the size of the object and the free space in the vehicle. In this regard, based on determining that the free space is equal to or greater than the size of the object, the at least one processor may obtain, from a storage medium (e.g., storage 115, storage component 440, etc.), information associated with at least one legal requirement ("third information" herein), and then determine, based on the third information, whether loading the object onto the free space fulfills or violates the at least one legal requirement. Accordingly, based on determining that loading the object onto the free space fulfills the at least one legal requirement, the at least one processor may determine that the vehicle has the sufficient loading capacity. On the other hand, based on determining that the free space is smaller than the size of the object, or based on determining that loading the object onto the free space violates the at least one legal requirement, the at least one processor may determine that the vehicle does not have the sufficient loading capacity.

According to example embodiments, the at least one processor of the server 110 may determine one or more loading requirements associated with the object and taking into consideration the one or more loading requirements when determining the at least one loading recommendation. For instance, the at least one processor may determine, based on the object information/first information, whether or not the object is temperature-sensitive. In this regard, based on determining that the object is temperature-sensitive, the at least one processor may determine, based on the vehicle information/second information (which includes information of the temperature in the vehicle cabin and/or the vehicle trunk), whether or not the temperature in the vehicle cabin and/or the vehicle trunk is suitable for loading the object (e.g., whether or not the temperature in the vehicle cabin and/or the vehicle trunk is equal to or lower than a maximum temperature for loading the object, etc.). In some example embodiments, the at least one processor may determine an amount of ice or dry ice (e.g., grams, kilograms, etc.) required to keep the temperature of the object below the maximum temperature until the vehicle reaches to destination.

According to example embodiments, the at least one processor of the server 110 may be configured to determine the at least one alternative configuration by obtaining, from a database or a storage medium (e.g., storage 115, storage component 440, etc.), information associated with a specification of the vehicle ("fourth information" herein), and then determine, based on the fourth information, the at least one alternative configuration. Accordingly, the at least one processor may include the at least one alternative configuration into the at least one loading recommendation.

The specific operations for determining the at least one loading recommendation have been described above with reference to FIG. 1 to FIG. 3E, thus redundant descriptions associated therewith may be omitted below for conciseness.

Upon determining the at least one loading recommendation, the method 500 may proceed to operation S560, at which the at least one processor of the server 110 may be configured to provide, to the UE of the user, the at least one loading recommendation, such that the UE may present the at least one loading recommendation based thereon. For instance, the UE may generate one or more GUIs that include one or more diagrams illustrating the at least one loading recommendation. The specific operations for presenting the at least one loading recommendation have been described above with reference to FIG. 1 to FIG. 3E, thus redundant descriptions associated therewith may be omitted below for conciseness In view of the above, example embodiments of the present disclosure provide a system, a method, or the like, that effectively and efficiently determine and provide one or more loading recommendations for loading an object onto a vehicle. Specifically, example embodiments enable a user to remotely determine whether or not the vehicle has sufficient loading capacity for appropriately loading the object, without violating any traffic regulation/legal requirement. Further, example embodiments may take into consideration information that may not be known by the user (e.g., legal requirement, possible alternative configuration(s) of the vehicle, temperature of the vehicle, etc.) when determining the loading recommendation. Accordingly, the loading recommendation provided by the example embodiments may be more accurate and more viable. Furthermore, example embodiments also provide alternative solutions to the user when the current configuration/situation of the vehicle does not provide sufficient loading capacity for the object. In addition, example embodiments also provide suggestions on an alternative object(s) or product(s) that can be appropriately loaded onto the vehicle, when it is determined that the desired object/product cannot be loaded onto the vehicle.

It is contemplated that features, advantages, and significances of example embodiments described hereinabove are merely a portion of the present disclosure, and are not intended to be exhaustive or to limit the scope of the present disclosure. Further descriptions of the features, components, configuration, operations, and implementations of example embodiments of the present disclosure, as well as the associated technical advantages and significances, are provided in the following.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer-readable medium at any possible technical detail level of integration. Further, as described hereinabove, one or more of the above components described above may be implemented as instructions stored on a computer readable medium and executable by at least one processor (and/or may include at least one processor). The computer-readable medium may include a computer-readable non-transitory storage medium (or media) having computer-readable program instructions thereon for causing a processor to carry out operations.

The computer readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object-oriented programming languages such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or another device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer-readable media according to various embodiments. In this regard, each block in the flowchart or block diagrams may represent a module, segment, or portion of instructions, which comprises one or more executable instructions for implementing the specified logical function(s). The method, computer system, and computer-readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method, performed by at least one processor of a server, for providing at least one loading recommendation a user, the method comprises:

obtaining, from a user equipment (UE) associated with the user, first information associated with an object;

determining, based on the first information, a size of the object;

obtaining second information associated with the vehicle;

determining, based on the second information, a free space in the vehicle;

obtaining, based on the size of the object and the free space in the vehicle, regulatory information associated with at least one of: a legal requirement or a traffic regulation;

determining, based on the size of the object, the free space in the vehicle, and the regulatory information, the at least one loading recommendation; and providing the at least one loading recommendation.

2. The method according to claim 1, wherein the determining the at least one loading recommendation comprises:

determining, based on the size of the object and the free space of the vehicle, whether or not the vehicle has sufficient loading capacity for accommodating the object;

based on determining that the vehicle has the sufficient loading capacity, determining at least one position for loading the object within the free space and including the information of the at least one position in the at least one loading recommendation;

based on determining that the vehicle does not have the sufficient loading capacity, determining whether or not at least one alternative configuration of the vehicle for creating the sufficient loading capacity is available;

based on determining that the at least one alternative configuration is available, determining at least one position for loading the object within the alternative configuration and including the information of the at least one position and the at least one alternative configuration in the at least one loading recommendation;

based on determining that the at least one alternative configuration is not available, determining whether or not at least one alternative object which can be accommodated within the free space is available; and based on determining that the at least one alternative object is available, including the information of the at least one alternative object in the at least one loading recommendation.

3. The method according to claim 2, wherein the determining whether or not the vehicle has the sufficient loading capacity comprises:

comparing the size of the object and the free space in the vehicle;

based on determining that the free space is equal to or greater than the size of the object, obtaining from a storage medium, third information associated with at least one legal requirement;

determining, based on the third information, whether loading the object onto the free space fulfills or violates the at least one legal requirement;

based on determining that loading the object onto the free space fulfills the at least one legal requirement, determining that the vehicle has the sufficient loading capacity; and based on determining that the free space is smaller than the size of the object or based on determining that loading the object onto the free space violates the at least one legal requirement, determining that the vehicle does not have the sufficient loading capacity.

4. The method according to claim 2, wherein the determining the at least one alternative configuration comprises:

obtaining, from a storage medium, fourth information associated with a specification of the vehicle; and determining, based on the fourth information, the at least one alternative configuration.

5. The method according to claim 1, wherein the first information comprises at least one image of the object, and wherein the determining the size of the object comprises:

processing the at least one image to calibrate a relationship between pixels in the at least one image and the object;

calculating the size of the object in pixels; and converting the size of the object into a measurement unit.

6. The method according to claim 1, wherein the first information comprises a description of the object.

7. The method according to claim 6, wherein the determining the size of the object comprises:

obtaining, from a database based on the description, information associated with the size of the object.

8. The method according to claim 6, wherein the determining the size of the object comprises:

processing the description with a large language model (LLM) to extract information associated with the size of the object.

9. The method according to claim 1, wherein the second information comprises one or more of: at least one image of a vehicle trunk and at least one image of a vehicle cabin, and wherein the second information is obtained by the vehicle system upon detecting a change in an ignition state of the vehicle.

10. The method according to claim 9, wherein the second information comprises a temperature in the vehicle cabin, and wherein the method further comprises:

determining, based on the first information, whether or not the object is temperature-sensitive; and based on determining that the object is temperature-sensitive, determining, based on the second information, whether or not the temperature in the vehicle cabin is suitable for loading the object.

11. A system implemented in a server for providing at least one loading recommendation to a user, the system comprising:

a memory storage storing computer-executable instructions; and at least one processor communicatively coupled to the memory storage, wherein the at least one processor is configured to execute the instructions to:

obtain first information associated with an object;

determine, based on the first information, a size of the object;

obtain, from a vehicle system implemented in a vehicle, second information associated with the vehicle;

determine, based on the second information, a free space in the vehicle;

obtaining, based on the size of the object and the free space in the vehicle, regulatory information associated with at least one of: a legal requirement or a traffic regulation;

determine, based on the size of the object, the free space in the vehicle, and the regulatory information, the at least one loading recommendation; and provide the at least one loading recommendation.

12. The system according to claim 11, wherein the at least one processor is configured to determine the at least one loading recommendation by:

determining, based on the size of the object and the free space of the vehicle, whether or not the vehicle has sufficient loading capacity for accommodating the object;

based on determining that the vehicle has the sufficient loading capacity, determining at least one position for loading the object within the free space and including the information of the at least one position in the at least one loading recommendation;

based on determining that the vehicle does not have the sufficient loading capacity, determining whether or not at least one alternative configuration of the vehicle for creating the sufficient loading capacity is available;

based on determining that the at least one alternative configuration is available, determining at least one position for loading the object within the alternative configuration and including the information of the at least one position and the at least one alternative configuration in the at least one loading recommendation;

based on determining that the at least one alternative configuration is not available, determining whether or not at least one alternative object which can be accommodated within the free space is available; and based on determining that the at least one alternative object is available, including the information of the at least one alternative object in the at least one loading recommendation.

13. The system according to claim 12, wherein the at least one processor is configured to determine whether or not the vehicle has the sufficient loading capacity by:

comparing the size of the object and the free space in the vehicle;

based on determining that the free space is equal to or greater than the size of the object, obtaining from a storage medium, third information associated with at least one legal requirement;

determining, based on the third information, whether loading the object onto the free space fulfills or violates the at least one legal requirement;

based on determining that loading the object onto the free space fulfills the at least one legal requirement, determining that the vehicle has the sufficient loading capacity; and based on determining that the free space is smaller than the size of the object or based on determining that loading the object onto the free space violates the at least one legal requirement, determining that the vehicle does not have the sufficient loading capacity.

14. The system according to claim 12, wherein the at least one processor is configured to determine the at least one alternative configuration by:

obtaining, from a storage medium, fourth information associated with a specification of the vehicle; and determining, based on the fourth information, the at least one alternative configuration.

15. The system according to claim 11, wherein the first information comprises at least one image of the object, and wherein the at least one processor is configured to determine the size of the object by:

processing the at least one image to calibrate a relationship between pixels in the at least one image and the object;

calculating the size of the object in pixels; and converting the size of the object into a measurement unit.

16. The system according to claim 11, wherein the first information comprises a description of the object.

17. The system according to claim 16, wherein the at least one processor is configured to determine the size of the object by:

obtaining, from a database based on the description, information associated with the size of the object.

18. The system according to claim 16, wherein the at least one processor is configured to determine the size of the object by:

processing the description with a large language model (LLM) to extract information associated with the size of the object.

19. The system according to claim 11, wherein the second information comprises one or more of: at least one image of a vehicle trunk and at least one image of a vehicle cabin, and wherein the second information is obtained by the vehicle system upon detecting a change in an ignition state of the vehicle.

20. The system according to claim 19, wherein the second information comprises a temperature in the vehicle cabin, and wherein the at least one processor is further configured to:

determine, based on the first information, whether or not the object is temperature-sensitive; and based on determining that the object is temperature-sensitive, determine, based on the second information, whether or not the temperature in the vehicle cabin is suitable for loading the object.

* * * * *